United States Patent
Miyajima et al.

(10) Patent No.: US 8,214,126 B2
(45) Date of Patent: Jul. 3, 2012

(54) SPEED CONTROL DEVICE FOR VEHICLE

(75) Inventors: Takayuki Miyajima, Anjo (JP); Yoshiyuki Yasui, Nahoya (JP)

(73) Assignee: Aisin AW Co., Ltd. (JP)

( * ) Notice: Subject to any disclaimer, the term of this patent is extended or adjusted under 35 U.S.C. 154(b) by 426 days.

(21) Appl. No.: 12/557,217

(22) Filed: Sep. 10, 2009

(65) Prior Publication Data
US 2010/0082215 A1   Apr. 1, 2010

(30) Foreign Application Priority Data
Sep. 29, 2008   (JP) .................................. 2008-249545

(51) Int. Cl.
*B60T 8/32*   (2006.01)
(52) U.S. Cl. ......................................... 701/93; 701/409
(58) Field of Classification Search .................... 701/93, 701/96, 200, 207–213, 300–302, 400, 409, 701/98
See application file for complete search history.

(56) References Cited

U.S. PATENT DOCUMENTS

| | | | | |
|---|---|---|---|---|
| 5,546,311 | A | * | 8/1996 | Sekine .............................. 701/93 |
| 5,748,476 | A | * | 5/1998 | Sekine et al. .................... 701/93 |
| 6,067,497 | A | | 5/2000 | Sekine et al. |
| 6,125,324 | A | | 9/2000 | Matsuda et al. |
| 6,219,609 | B1 | | 4/2001 | Matsuno et al. |
| 2005/0240334 | A1 | | 10/2005 | Matsumoto et al. |
| 2006/0190158 | A1 | | 8/2006 | Shiiba et al. |

FOREIGN PATENT DOCUMENTS

| | | |
|---|---|---|
| JP | 2002-362183 | 12/2002 |
| JP | 2006-123587 | 5/2006 |

* cited by examiner

*Primary Examiner* — Richard M. Camby
(74) *Attorney, Agent, or Firm* — Bacon and Thoms, PLLC

(57) ABSTRACT

A speed control device includes: a continuous curve acquiring unit that acquires curve shapes and positions of two successive curves in advance of the vehicle; a curve-to-curve distance calculating unit that calculates distance between the two curves based on curve shapes and positions of the two curves; a selection unit that selects, based on the curve shapes, the curve shape of the curve having the larger radius of curvature; a vehicle speed limit setting unit that sets, based on the curve-to-curve distance and selected curve shape, a vehicle speed limit for travel between the two curves; a target vehicle speed determination unit that determines, based on vehicle location, the curve shapes and positions, and the vehicle speed limit, a target vehicle speed for traveling the two curves; and a vehicle speed control unit that controls vehicle speed based on the target and detected vehicle speeds.

11 Claims, 13 Drawing Sheets

SPEED CONTROL DEVICE FOR VEHICLE

The disclosure of Japanese Patent Application No. 2008-249545 filed on Sep. 29, 2008, including the specification, drawings and abstract is incorporated herein by reference in its entirety.

BACKGROUND OF THE INVENTION

The present invention relates to a speed control device for a vehicle, and more particularly to a speed control device for a vehicle that controls a speed at which the vehicle runs along two successive curves.

DESCRIPTION OF THE RELATED ART

Conventionally, there is widely known a speed control device for a vehicle that performs speed control (automatic cruise control) to maintain a speed of the vehicle (vehicle speed) at a vehicle speed that has been set, for example, by a driver. There is also known a device that decelerates and adjusts the vehicle speed when the vehicle runs along two successive curves during this automatic cruise control.

For example, in a device described in Japanese Patent Application Publication No. JP-A-2002-362183, during the automatic cruise control, if an "appropriate vehicle speed for the two successive curves" is lower than the set vehicle speed, the vehicle is decelerated to the "appropriate vehicle speed for the two successive curves" instead of to the set vehicle speed when passing through the two successive curves (first and second curves). Specifically, over the period of passing through the two successive curves, the vehicle speed is maintained, in principle, at an appropriate vehicle speed for passing through the first curve appropriately. In addition, if an appropriate vehicle speed for appropriately passing through the second curve is lower than that for the first curve, the vehicle is decelerated again to the appropriate vehicle speed for the second curve when passing through the second curve.

An example of adjustment of the vehicle speed by the device described in Japanese Patent Application Publication No. JP-A-2002-362183 will be explained below with reference to FIG. 16, when an appropriate vehicle speed VS2 for the second curve is higher than an appropriate vehicle speed VS1 for the first curve (VS2=VS2$a$), and when the speed VS2 is lower than the speed VS1 (VS2=VS2$b$). Symbols CS1 (CS2) and CE1 (CE2) represent an entrance position of the first (second) curve and an exit position of the first (second) curve, respectively. The speed VS1 is assumed to be lower than a vehicle speed V1 that has been set by the driver.

In these cases, regardless of the relative magnitude between the speeds VS1 and VS2, the vehicle is decelerated from V1 to VS1 so that the vehicle speed reaches VS1 at the position CS1, and then the vehicle speed is maintained at VS1 over the period of passing through the first curve (CS1 to CE1). After that, if VS2<VS1, the vehicle is decelerated from VS1 to VS2$b$ while passing between the curves (CE1 to CS2), and then the vehicle speed is maintained at VS2$b$ over the period of passing through the second curve (CS2 to CE2). The vehicle is accelerated again to V1 after passing through the second curve. As a result, the vehicle can run along each of the two successive curves at the corresponding appropriate vehicle speed.

On the other hand, if VS2>VS1, the vehicle speed is still maintained at VS1 over the periods of passing between the curves (CE1 to CS2) and of passing through the second curve (CS2 to CE2). The vehicle is accelerated again to V1 after passing through the second curve. As a result, if, for example, the distance between the curves is long, the driver may feel uncomfortable due to lack of acceleration and so on, because the vehicle is not accelerated between the curves.

In addition, in a device described in Japanese Patent Application Publication No. JP-A-2006-123587, when an intention of the driver for acceleration is detected after passing through the first curve at the appropriate vehicle speed for the first curve, the vehicle is accelerated to a predetermined speed that is set based on the distance between the curves. Specifically, if, for example, the distance between the curves is within a predetermined range, the vehicle is accelerated to a mean value between the current vehicle speed and the appropriate vehicle speed for the second curve.

An example of adjustment of the vehicle speed by the device described in Japanese Patent Application Publication No. JP-A-2006-123587 will be explained below with reference to FIG. 17 that corresponds to FIG. 16 mentioned above, when the appropriate vehicle speed VS2 for the second curve is higher than the appropriate vehicle speed VS1 for the first curve (VS2=VS2$c$), and when the speed VS2 is lower than the speed VS1 (VS2=VS2$d$).

In these cases, the vehicle speed is adjusted in the same way as in the device described in Japanese Patent Application Publication No. JP-A-2002-362183 until the first curve has been passed through (CE1). After that, if VS2<VS1, and if the intention of the driver for acceleration is detected, the vehicle is decelerated from VS1 to a "mean value between VS1 and VS2$d$" while passing between the curves (CE1 to CS2), and decelerated again to the appropriate vehicle speed VS2$d$ for the second curve while passing through the second curve (CS2 to CE2).

On the other hand, if VS2>VS1, and if the intention of the driver for acceleration is detected, the vehicle is accelerated from VS1 to a "mean value between VS1 and VS2$c$" while passing between the curves (CE1 to CS2), and the vehicle speed is maintained at the "mean value between VS1 and VS2$c$" over the period of passing through the second curve (CS2 to CE2). As a result, if, for example, the distance between the curves is long, the driver may feel uncomfortable due to lack of acceleration and so on, because the vehicle cannot be accelerated sufficiently between the curves, similarly to the case of the device described in Japanese Patent Application Publication No. JP-A-2002-362183 mentioned above.

Now, as shown in FIG. 18, in the order from a curve start point Ci (curve entrance) to a curve end point Cd (curve exit), a single curve on a general road is composed of an entrance relaxation curve interval Zci (where the radius of curvature gradually decreases as the vehicle travels ahead), a constant curvature radius interval Zit, and an exit relaxation curve interval Zcd (where the radius of curvature gradually increases as the vehicle travels ahead). The relaxation curves are composed, for example, of clothoid curves. The relaxation curve intervals are provided so that the vehicle can smoothly pass through the curve without requiring a rapid steering wheel operation of the driver, by turning the steering wheel gradually, and then returning the steering wheel gradually.

When each of the curves is composed of the above-described curves when the vehicle runs along the two successive curves, the driver may feel natural if the vehicle is accelerated, after being decelerated to the appropriate vehicle speed for the first curve, to a speed equal to or more than the appropriate vehicle speed that is the higher of the appropriate vehicle speeds for the first and the second curves, and then decelerated to the appropriate vehicle speed for the second curve.

SUMMARY OF THE INVENTION

In view of the circumstances described above, it is an object of the present invention to provide a speed control device for a vehicle that is capable of achieving speed control conforming to the feeling of the driver and giving little sense of discomfort to the driver when the vehicle passes through two successive curves.

A speed control device for a vehicle according to a first aspect of the present invention includes a vehicle speed acquiring unit that acquires a speed of the vehicle, a vehicle position acquiring unit that acquires a position of the vehicle, a continuous curve acquiring unit that acquires curve shapes and positions of two successive curves located in front of the vehicle, and a curve-to-curve distance calculating unit that calculates a curve-to-curve distance between the two curves based on the curve shapes and the positions of the two curves. Here, the term "two successive curves" refers to two curves in which an end point of a first curve and a start point of a second curve coincide with each other, or two curves in which a straight-line interval of a predetermined distance or less lies between the end point of the first curve and the start point of the second curve. In addition, the term "curve-to-curve distance" refers, for example, to a distance of an interval between a reference point of the first curve and a reference point of the second curve.

The speed control device for a vehicle according to the first aspect of the present invention includes a selection unit that selects, based on the curve shapes of the two curves, the curve shape of one of the two curves having a radius of curvature larger than that of the other of the two curve shapes, a vehicle speed limit setting unit that sets, based on the curve-to-curve distance and the selected curve shape, a vehicle speed limit to which the speed of the vehicle is to be limited between the two curves, and a target vehicle speed determination unit that determines, based on the vehicle position, the curve shapes and the positions of the two curves, and the vehicle speed limit, a target vehicle speed (characteristic) at which the vehicle is to run along the two curves. Here, it is preferable that, between the curves, the target vehicle speed be determined so that there is an interval in which the target vehicle speed (characteristic) equals to the vehicle speed limit, and also so that the target vehicle speed (characteristic) does not exceed the vehicle speed limit.

The speed control device for a vehicle according to a second aspect of the present invention may include, instead of the selection unit, an appropriate vehicle speed determination unit that determines, based on the curve shapes of the two curves, appropriate vehicle speeds for the vehicle to pass through the respective curves appropriately. The appropriate vehicle speeds can be determined, for example, based on minimum radii of curvature of the curves. In this case, the vehicle speed limit setting unit is structured so as to set, based on the curve-to-curve distance, the vehicle speed limit to a value equal to or more than an appropriate vehicle speed that is the higher of the two appropriate vehicle speeds, and the target vehicle speed determination unit is structured so as to determine the target vehicle speed (characteristic) based on the vehicle position, the curve positions of the two curves, the two appropriate vehicle speeds, and the vehicle speed limit. Here, it is preferable that, between the curves, the target vehicle speed be determined so that there is an interval in which the target vehicle speed (characteristic) equals to the vehicle speed limit, and also so that the target vehicle speed (characteristic) does not exceed the vehicle speed limit.

In addition, the speed control device for a vehicle according to the second aspect of the present invention includes a vehicle speed control unit that controls the speed of the vehicle based on the target vehicle speed (characteristic) and the vehicle speed. Here, the vehicle speed may be controlled either so as to coincide with the target vehicle speed (characteristic), or so as not to exceed the target vehicle speed (characteristic) (using the target vehicle speed as an upper limit value).

With the structure described above, the vehicle speed limit for the interval between the curves is set, based on the curve-to-curve distance and the shape of the curve having the larger radius of curvature, to the value equal to or more than the appropriate vehicle speed that is the higher of the appropriate vehicle speeds corresponding to the two curves. In addition, between the curves, the target vehicle speed is determined so that there is the interval in which the target vehicle speed equals to the vehicle speed limit. Consequently, between the curves, the vehicle speed is controlled so that there is the interval in which the vehicle speed is controlled at the same value as the vehicle speed limit.

Therefore, when the vehicle passes through the two successive curves, the vehicle can be accelerated, after being decelerated to the appropriate vehicle speed for the first curve, to the speed equal to or more than the appropriate vehicle speed that is the higher of the appropriate vehicle speeds for the first and the second curves, and then can be decelerated to the appropriate vehicle speed for the second curve. As a result, it is possible to achieve the speed control conforming to the feeling of the driver and giving little sense of discomfort to the driver.

It is preferable that the above-described speed control device according to the second aspect of the present invention be structured so that the vehicle speed limit is set to a value equal to the appropriate vehicle speed that is the higher of the two appropriate vehicle speeds if the curve-to-curve distance is a predetermined value or less. With this structure, it is possible to suppress the vehicle from being unnecessarily accelerated between the curves if the two curves are close to each other (if the curve-to-curve distance is small).

In addition, in the above-described speed control device according to any one of the first and the second aspects of the present invention, it is preferable that the vehicle speed limit be set to be larger as the curve-to-curve distance is larger. With this structure, it is possible to increase the maximum vehicle speed between the curves as the curve-to-curve distance is larger, thereby enabling to achieve the speed control further conforming to the feeling of the driver and giving little sense of discomfort to the driver.

It is preferable that the speed control device according to any one of the first and the second aspects of the present invention further include an acceleration operating amount acquiring unit that acquires an operating amount of an acceleration operating member operated by the driver of the vehicle, and that, in the speed control device, the target vehicle speed determination unit be structured so as to determine, the target vehicle speed to be larger when the operating amount is greater than zero than the target vehicle speed when the operating amount is zero. The target vehicle speed can also be set in this manner in an interval in which the radius of curvature gradually decreases in the two curves. In this case, the target vehicle speed can be determined to be larger, for example, as the operating amount is larger.

With this structure, when the driver performs an accelerating operation while the vehicle is running along the two successive curves, the vehicle speed can be made higher than that when the driver performs no accelerating operation. Consequently, it is possible to achieve the speed control conforming to the requirement of the driver to accelerate the vehicle and giving less sense of discomfort to the driver.

When the accelerating operation by the driver is taken into account in this manner, it is preferable that the target vehicle speed determination unit be structured so as to determine the target vehicle speed so that an increment of the target vehicle speed from the target vehicle speed when the operating amount is zero does not exceed a predetermined upper limit. With this structure, it is possible to suppress the vehicle from being unnecessarily accelerated when the vehicle runs along the two successive curves.

DETAILED DESCRIPTION OF THE EMBODIMENTS

An embodiment of a speed control device for a vehicle according to the present invention will be described below with reference to the accompanying drawings.

(Structure)

Figure 1:
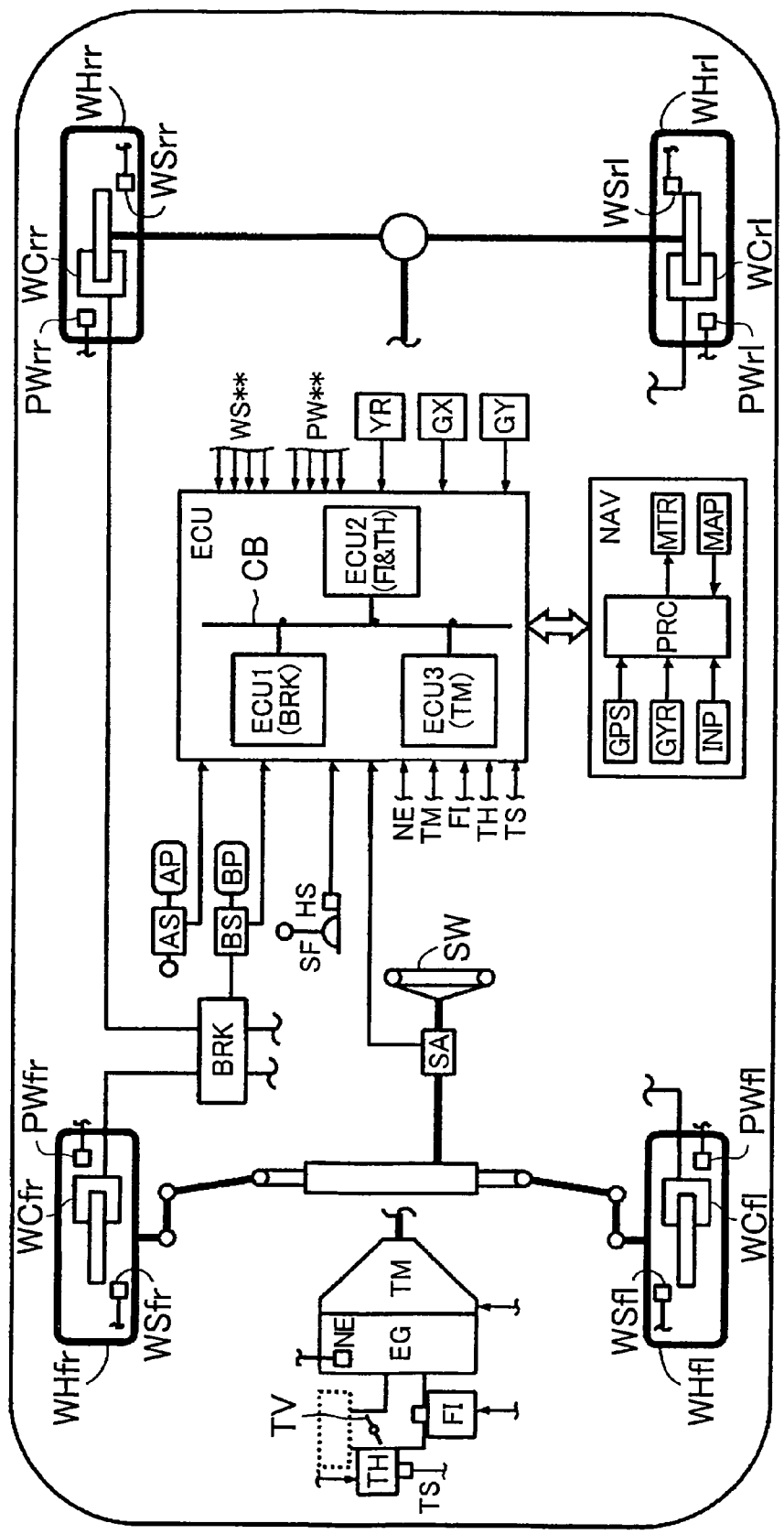
FIG. 1 is a schematic block diagram of a vehicle equipped with a speed control device for a vehicle according to an embodiment of the present invention.

FIG. 1 shows a schematic structure of a vehicle equipped with a speed control device (hereinafter referred to as "present device") according to an embodiment of the present invention. The present device is equipped with an engine EG serving as a power source of the vehicle, an automatic transmission TM, a brake actuator BRK, an electronic control unit ECU, and a navigation device NAV.

The engine EG is, for example, an internal combustion engine. That is, an opening of a throttle valve TV is regulated by a throttle actuator TH in response to operation of an accelerator pedal (acceleration operating member) AP by a driver. A fuel injection actuator (injector) FI injects fuel of a quantity proportional to the quantity of intake air regulated depending on the opening of the throttle valve TV. As a result, an output torque is obtained depending on the operation of the accelerator pedal AP by the driver.

The automatic transmission TM is a multi-speed automatic transmission with a plurality of shift speeds, or a continuously variable transmission with no shift speeds. The automatic transmission TM is capable of changing a reduction ratio (rotational speed of EG output shaft[=TM input shaft]/rotational speed of TM output shaft) depending on the operating state of the engine EG and the position of a shift lever (shift operating member) SF, in an automatic manner (without operation of the shift lever SF by the driver).

The brake actuator BRK has a known structure equipped with a plurality of solenoid valves, a hydraulic pump, a motor, and so on. In an uncontrolled state, the brake actuator BRK supplies brake pressure depending on the operation of a brake pedal (brake operating member) BP by the driver to each of wheel cylinders WC at corresponding wheels WH. In a controlled state, the brake actuator BRK can regulate the brake pressure in each of the wheel cylinders WC at each of the corresponding wheels WH, independently of the operation of the brake pedal BP (and of the operation of the accelerator pedal AP).

Note that the suffix "" appended to each of the various symbols indicates to which wheel each of the symbols corresponds; that is, "fl" indicates correspondence to a front left wheel, "fr" to a front right wheel, "rl" to a rear left wheel, and "rr" to a rear right wheel. For example, the wheel cylinders WC comprehensively represent a front left wheel cylinder WCfl, a front right wheel cylinder WCfr, a rear left wheel cylinder WCrl, and a rear right wheel cylinder WCrr.

The present device is equipped with wheel speed sensors WS for detecting wheel speeds of the wheels WH; brake pressure sensors PW for detecting the brake pressures in the wheel cylinders WC; a steering wheel angle sensor SA for detecting a rotational angle (from a neutral position) of a steering wheel angle sensor SW; a yaw rate sensor YR for detecting a yaw rate of a vehicle body; a longitudinal acceleration sensor GX for detecting an acceleration (deceleration) in a longitudinal direction of the vehicle body; a lateral acceleration sensor GY for detecting an acceleration in a lateral direction of the vehicle body; an engine speed sensor NE for detecting the rotational speed of the output shaft of the engine EG; an acceleration operating amount sensor AS for detecting an operating amount of the accelerator pedal (acceleration operating member) AP; a brake operating amount sensor BS for detecting an operating amount of the brake pedal BP; a shift position sensor HS for detecting a position of the shift lever SF; and a throttle valve opening sensor TS for detecting the opening of the throttle valve TV.

The electronic control unit ECU is a microcomputer for electronically controlling a power train system and a chassis system. The electronic control unit ECU is electrically connected to, or capable of communicating via a network with, the above-mentioned various actuators, the above-mentioned various sensors, and the automatic transmission TM. The electronic control unit ECU is composed of a plurality of control units ECU 1 to ECU 3 that are connected to each other via a communication bus CB.

The ECU 1 in the electronic control unit ECU is a wheel brake control unit, which executes brake pressure control (wheel brake control) including well-known types of control such as vehicle stability control (ESC), anti-skid control (ABS), and traction control (TCS), by controlling the brake actuator BRK based on signals from sources such as the wheel speed sensors WS, the longitudinal acceleration sensor GX, the lateral acceleration sensor GY, and the yaw rate sensor YR. In addition, the ECU 1 calculates a vehicle speed Vx based on detection results (wheel speeds Vw) of the wheel speed sensors WS**.

The ECU 2 in the electronic control unit ECU is an engine control unit, which executes output torque control (engine control) of the engine EG by controlling the throttle actuator TH and the fuel injection actuator FI based on signals from the acceleration operating amount sensor AS and the like.

The ECU 3 in the electronic control unit ECU is an automatic transmission control unit, which executes reduction ratio control (transmission control) by controlling the automatic transmission TM based on signals from the shift position sensor HS and the like.

The navigation device NAV is equipped with a navigation processing device PRC, which is electrically connected to a vehicle position detecting unit (global positioning system) GPS, a yaw rate gyro GYR, an input section INP, a memory section MAP, and a display section MTR. The navigation device NAV is electrically connected to, or capable of communicating via wireless connection with, the electronic control unit ECU.

The vehicle position detecting unit GPS is capable of detecting a position (latitude, longitude, etc.) of the vehicle by a known method using a positioning signal from an artificial satellite. The yaw rate gyro GYR is capable of detecting an angular velocity (yaw rate) of the vehicle body. The input section INP receives operational input by the driver regarding navigation functions. The memory section MAP has a variety of stored information such as map information and road information.

The navigation processing device PRC processes signals from the vehicle position detecting unit GPS, the yaw rate gyro GYR, the input section INP, and the memory section MAP in an integrated manner, and displays the result of the processing (information regarding the navigation functions) on the display section MTR.

(Outline of Speed Control by Present Device)

Figure 2:
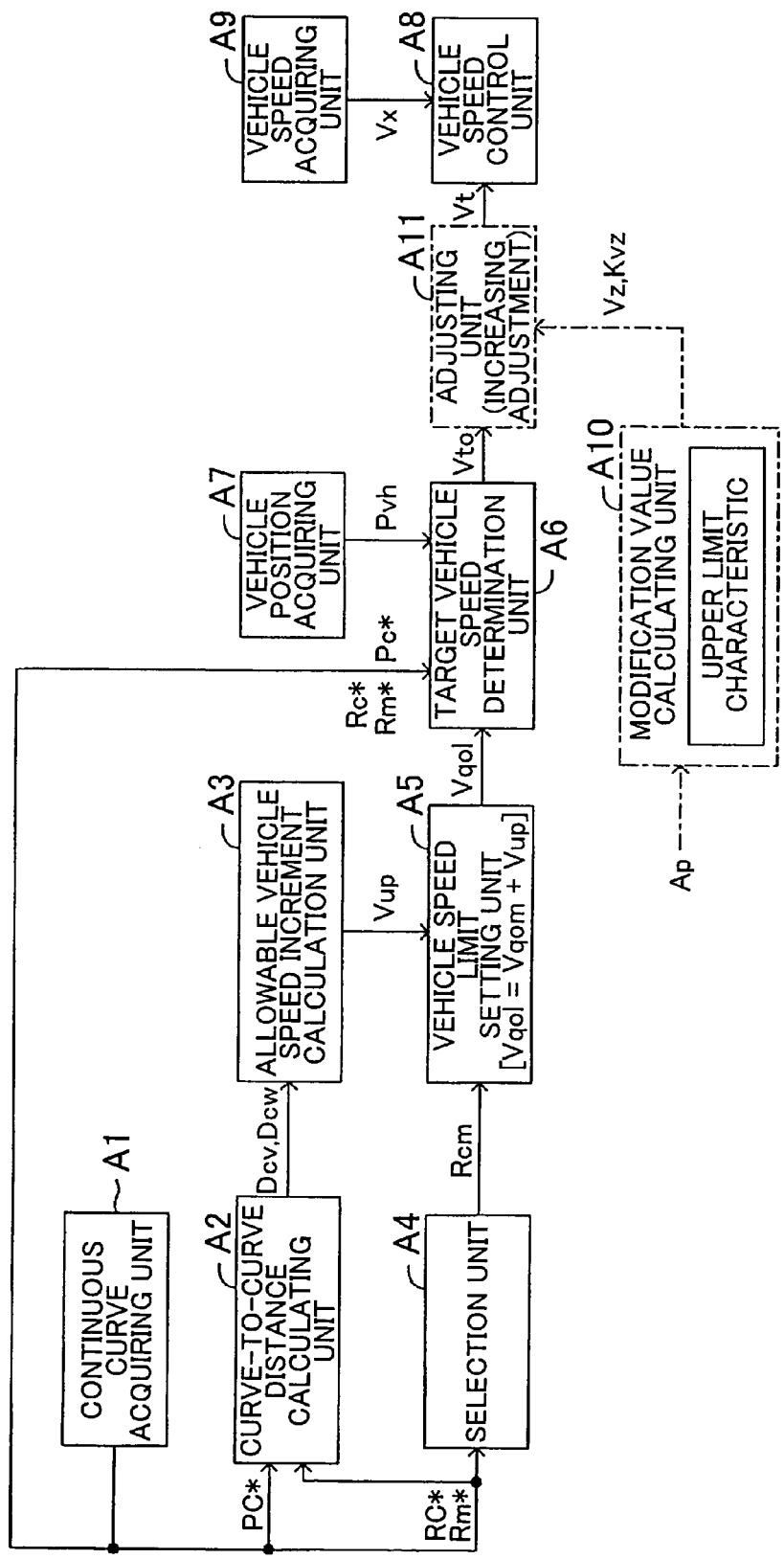
FIG. 2 is a functional block diagram for explaining an outline of speed control executed by the device shown in FIG. 1.

The outline of the speed control by the present device structured as explained above will be described below with reference to FIG. 2.

First, a continuous curve acquiring unit A1 acquires shapes Rc*, minimum radii of curvature Rm*, and positions Pc* of two successive curves (a first curve and a second curve) located in the forward direction of travel of the vehicle. Here, the suffix "*" appended to each of the various symbols indicates to which of the two successive curves each of the symbols corresponds; that is, "1" indicates correspondence to the first curve (curve at the nearest location in front of the vehicle) and "2" to the second curve (curve next to the first curve).

A curve-to-curve distance calculating unit A2 calculates a distance between the two successive curves (hereinafter referred to as "curve-to-curve distance") Dcv, Dcw based on the curve shapes Rc*, the minimum radii of curvature Rm*, and the curve positions Pc* that have been acquired. The distances Dcv and Dcw will be described later.

An allowable vehicle speed increment calculation unit A3 calculates, based on the calculated curve-to-curve distance Dcv, Dcw, a component by which the vehicle speed is allowed to increase (allowable vehicle speed increment Vup) when passing between the two successive curves (an interval corresponding to the curve-to-curve distance will be hereinafter referred to as "curve-to-curve interval").

A selection unit A4 selects a curve shape Rcm having a larger radius of curvature based on the shapes Rc* and the minimum radii of curvature Rm* of the two successive curves. The curve shape, for example, having a larger minimum radius of curvature of the radii Rm* is selected as the curve shape Rcm.

A vehicle speed limit setting unit A5 sets, based on the curve shape Rcm having the larger radius of curvature and the allowable vehicle speed increment Vup, a vehicle speed limit Vqo1 to which the vehicle speed is to be limited in the curve-to-curve interval. Specifically, the vehicle speed limit setting unit A5 calculates, based on the curve shape Rcm, an appropriate vehicle speed Vqom required for the vehicle to appropriately pass through the curve having the larger radius of curvature, and by adding the allowable vehicle speed increment Vup to the appropriate vehicle speed Vqom, sets the vehicle speed limit Vqo1 so as to be equal to or more than the appropriate vehicle speed Vqom.

A target vehicle speed determination unit A6 determines a calculation map that specifies a target vehicle speed characteristic Vto, based on the curve shapes Rc*, the minimum radii of curvature Rm*, the curve positions Pc*, and the vehicle speed limit Vqo1 for the curve-to-curve interval. By entering a host vehicle position Pvh acquired by a vehicle position acquiring unit A7 into this calculation map, the target vehicle speed Vto in the host vehicle position is determined.

Figure 3:
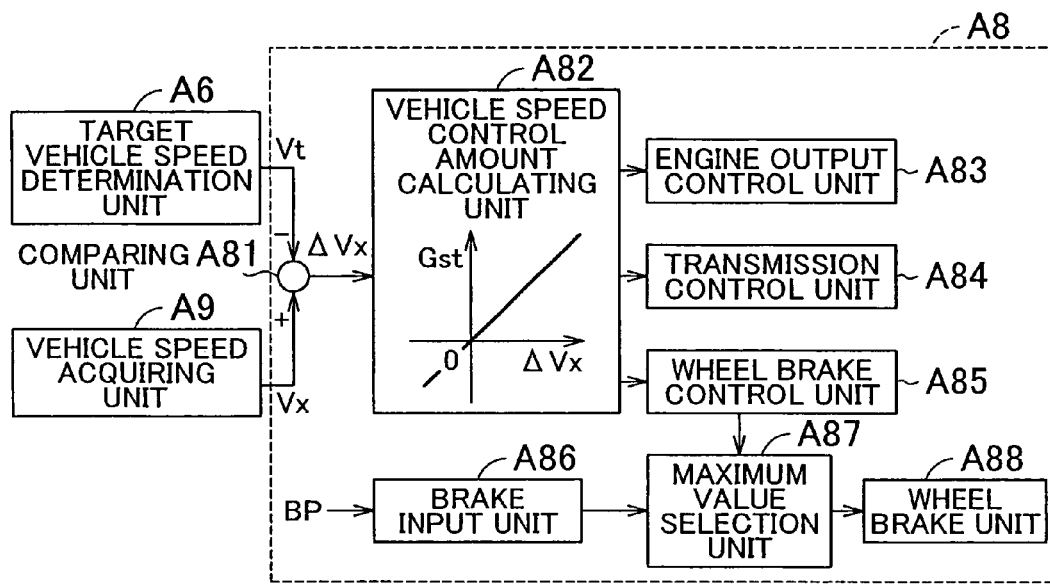
FIG. 3 is a functional block diagram for explaining the speed control executed by a vehicle speed control unit shown in FIG. 2.

A vehicle speed control unit A8 controls the speed of the vehicle based on this target vehicle speed Vto (Vt) and an actual vehicle speed Vx acquired by a vehicle speed acquiring unit A9. Specifically, as shown in FIG. 3, first, a comparing unit A81 calculates a difference between the vehicle speed Vx and the target vehicle speed Vt (speed deviation $\Delta Vx$), and then, a vehicle speed control amount calculating unit A82 calculates a vehicle speed control amount Gst based on the speed deviation $\Delta Vx$ and the map shown in the figure.

Based on this vehicle speed control amount Gst, the vehicle speed Vx is controlled so as to coincide with the target vehicle speed Vt by using at least one of engine output control by an engine output control unit A83, reduction ratio control by a transmission control unit A84, and wheel brake (brake pressure) control by a wheel brake control unit A85. Note that, in the engine output control, at least one of the parameters such as the opening of the throttle valve TV, an ignition timing, and a fuel injection amount is adjusted.

In addition, when a brake input unit A86 detects the operation of the brake pedal BP by the driver, a maximum value selection unit A87 selects the larger of a brake torque (brake pressure) by the wheel brake control unit A85 and a brake torque (brake pressure) by the operation of the driver, and a wheel brake unit A88 applies the selected brake torque (brake pressure). The purpose of this is to enable overriding of the brake torque by the brake operation by the driver during continuous curve vehicle speed control.

In this manner, based on the curve-to-curve distance Dcv, Dcw, and on the curve shape Rcm having the larger radius of curvature, the vehicle speed limit Vqo1 for the curve-to-curve interval is set to a value equal to or more than the appropriate vehicle speed Vqom for the curve having the larger radius of curvature. In addition, in the curve-to-curve interval, the target vehicle speed Vt is determined so that there is an interval in which the target vehicle speed Vt equals to the vehicle speed limit Vqo1, as will be described later. Consequently, in the curve-to-curve interval, the vehicle speed is controlled so that there is the interval in which the vehicle speed is controlled at the same value as the vehicle speed limit Vqo1.

Therefore, when the vehicle passes through the two successive curves, the vehicle can be accelerated, after being decelerated to an appropriate vehicle speed Vqo1 required for the vehicle to appropriately pass through the first curve, to the speed equal to or more than the appropriate vehicle speed Vqom, which is the higher of the appropriate vehicle speeds for the first and the second curves, and then can be decelerated to an appropriate vehicle speed Vqo2 for the second curve, as will be described later. As a result, it is possible to achieve the speed control (continuous curve vehicle speed control to be described later) conforming to the feeling of the driver and giving little sense of discomfort to the driver.

In addition, by using modification values (specifically, a modification vehicle speed Vz and a modification coefficient Kvz to be described later) that are calculated by a modification value calculating unit A10 based on the operating amount (acceleration operating amount) Ap of the accelerator pedal AP operated by the driver, which is detected by the acceleration operating amount sensor AS, the target vehicle speed Vto determined by the target vehicle speed determination unit A6 can be modified to increase based on the acceleration operating amount Ap. The vehicle speed control can be achieved based on the target vehicle speed Vt ($\geq$Vto) obtained by this modification. In this case, upper limits (Vz1, Vz4, and Kz6 to be described later) are set for these modification values, regardless of the level of the acceleration operating amount Ap.

By this modification of the target vehicle speed, the acceleration operating amount Ap is taken into account in calculating the target vehicle speed, and thus the acceleration in response to the accelerating operation by the driver can be allowed while the vehicle is running along the two successive curves. As a result, it is possible to achieve the speed control (continuous curve vehicle speed control) conforming to the requirement of the driver to accelerate the vehicle and giving less sense of discomfort to the driver. In addition, it is possible to suppress the vehicle from being unnecessarily accelerated, because the upper limit characteristic is provided for this modification of the target vehicle speed.

(Automatic Cruise Control)

Figure 4:
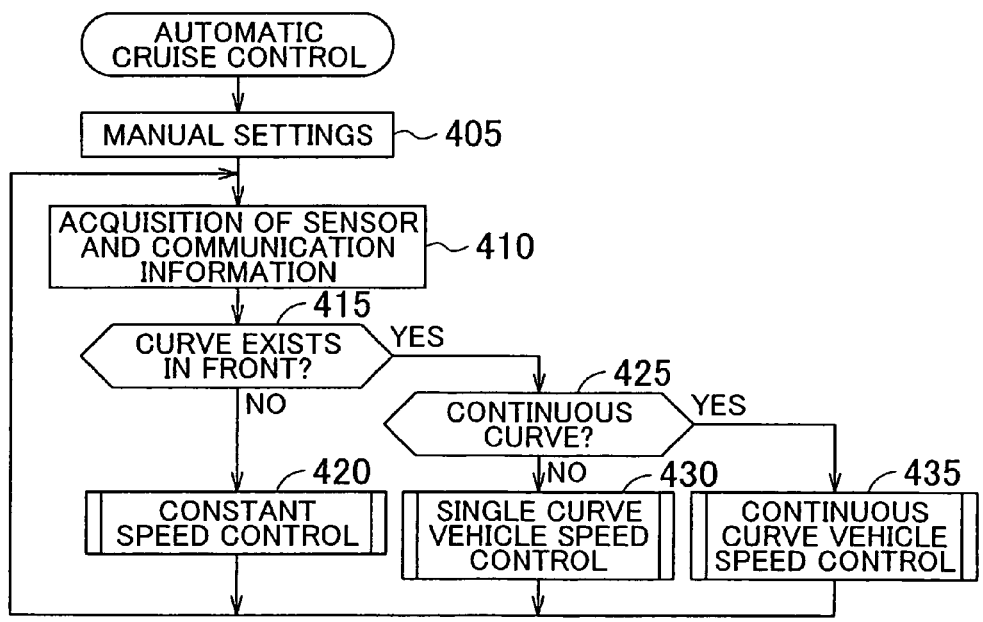
FIG. 4 is a flow chart concerning automatic cruise control executed by the device shown in FIG. 1.

Automatic cruise control serving as a specific embodiment of the speed control by the present device will be described below with reference to FIG. 4.

First, in step 405, a state of manual settings manually set by the driver is read. When manually setting the settings, an ON state of an automatic cruise switch (not shown) and a set vehicle speed Vs are set. Next, in step 410, information is acquired from various sensors, and communication information is acquired via the communication bus CB.

Next, in step 415, it is determined whether or not a curve exists in the forward direction of travel of the vehicle. This determination is performed based on the information from the navigation device NAV. If it is determined that no curve exists, constant speed control is executed in step 420. The constant speed control is a known type of vehicle speed control that maintains the vehicle speed at the set vehicle speed Vs to run the vehicle at the constant speed.

Figure 18:
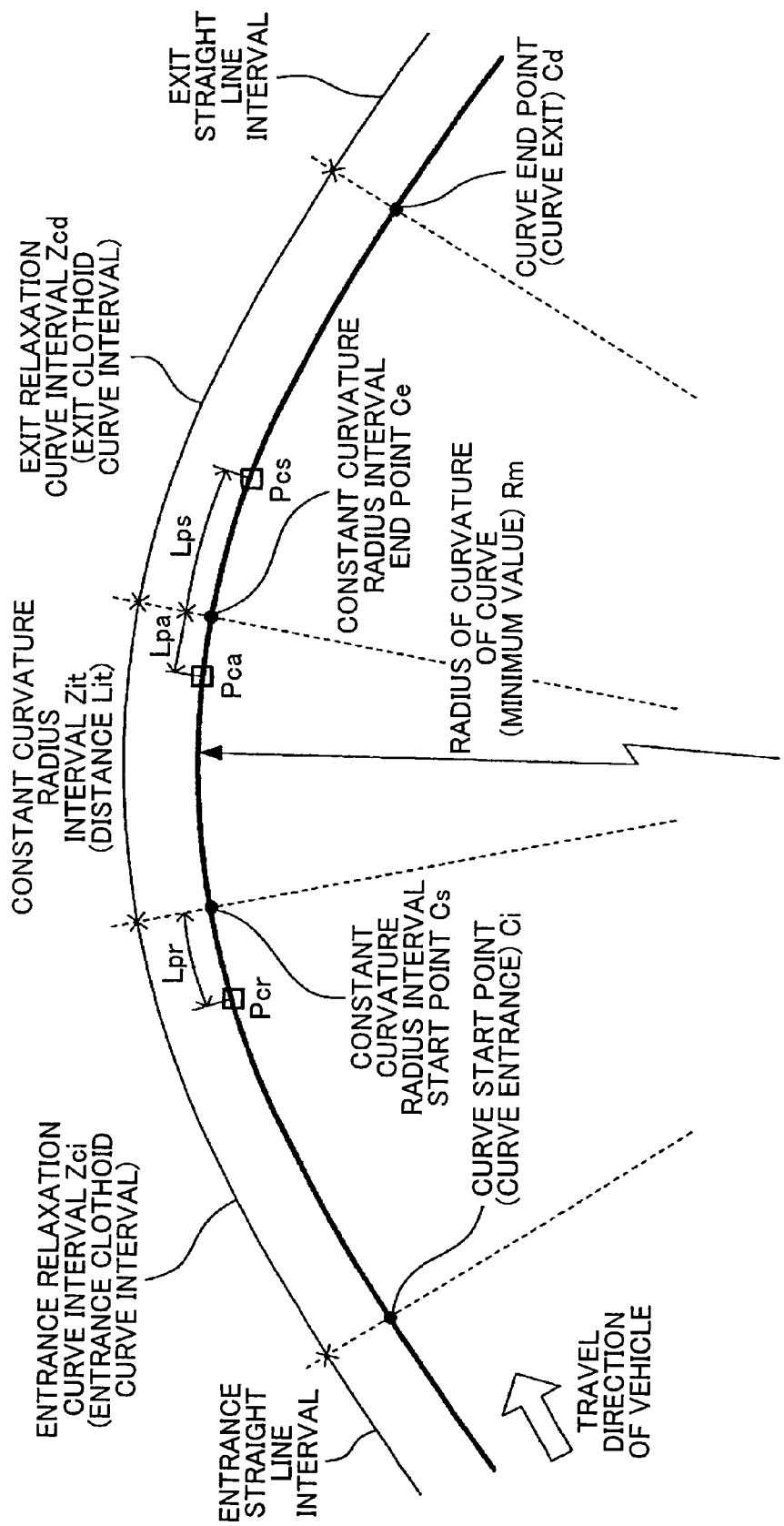
FIG. 18 is a diagram showing an example of a shape of a curve.

On the other hand, if it is determined that a curve exists in the forward direction of travel of the vehicle, it is determined in step 425 whether or not the curve is a pair of curves that are continuous to each other (hereinafter referred also to as "continuous curve"). For example, if each of the curves has a shape as shown in FIG. 18, the term "continuous curve" refers to the two curves in which an exit relaxation curve interval of the first curve and an entrance relaxation curve interval of the second curve are continuous to each other, or to two curves in which a straight-line interval of a predetermined distance or less lies between the exit relaxation curve interval of the first curve and the entrance relaxation curve interval of the second curve (the same applies in the description below).

If the curve in front is not the continuous curve, vehicle speed control for the case of running along a single curve (single curve vehicle speed control) is executed in step 430. Otherwise, if the curve in front is the continuous curve, the vehicle speed control for the case of running along a continuous curve (continuous curve vehicle speed control) is executed in step 435.

Here, the curve speed control is, regardless of whether it is "single" or "continuous," a type of control that decelerates the vehicle from the set vehicle speed Vs to a vehicle speed appropriate for the curve (appropriate vehicle speed), and then accelerates the vehicle to the set vehicle speed Vs, so that the vehicle can pass through the curve in a stable manner. The single curve vehicle speed control is a known type of vehicle speed control that decelerates the vehicle from the set vehicle speed Vs to a vehicle speed appropriate for the single curve (appropriate vehicle speed), and then accelerates the vehicle to the set vehicle speed Vs. The continuous curve vehicle speed control will be described below.

The above-described constant speed control constituting the automatic cruise control, the single curve vehicle speed control, and the continuous curve vehicle speed control, are achieved by the above-described vehicle speed control unit A8 that adjusts the vehicle speed by using at least one of the engine output control, the reduction ratio control, and the wheel brake control.

(Continuous Curve Vehicle Speed Control)

Figure 5:
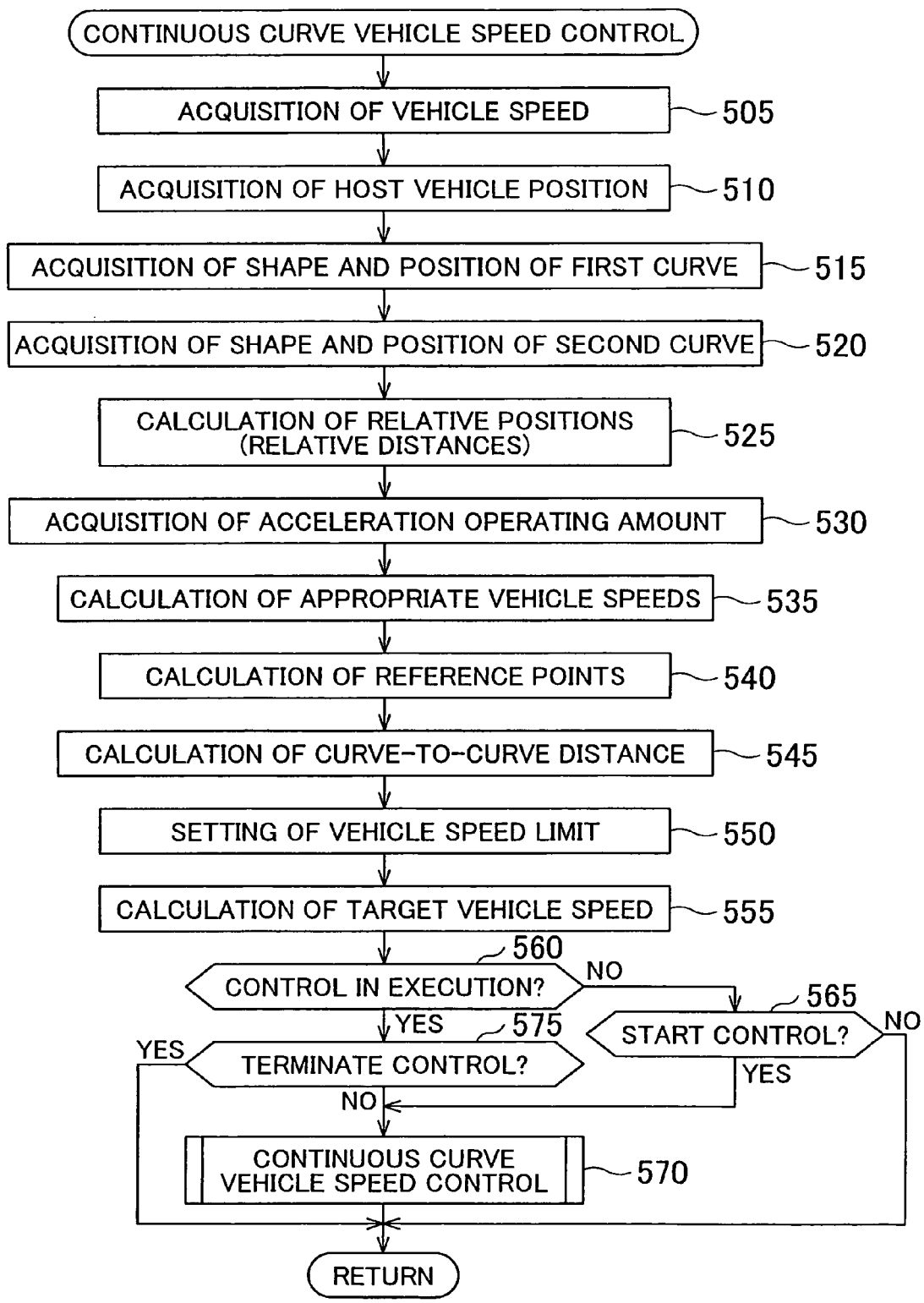
FIG. 5 is a flow chart concerning continuous curve vehicle speed control serving as a part of the automatic cruise control shown in FIG. 4.

The above-mentioned continuous curve vehicle speed control will be described below with reference to FIG. 5 and so on. The routine shown in FIG. 5 is started if it is determined that the two successive curves (continuous curve of the first curve and the second curve) exist in the forward direction of travel of the vehicle, as described above. In the continuous curve vehicle speed control, the vehicle speed is controlled based on the speed of the vehicle (vehicle speed) Vx, the curve shape Re*, and the relative distance between each curve and the vehicle (distance between the curve and the vehicle), so that the vehicle can pass through the continuous curve appropriately. Here, as described above, the suffix "*" appended to each of the various symbols indicates to which of the two successive curves each of the symbols corresponds; that is, "1" indicates correspondence to the first curve (curve at the nearest location in front of the vehicle) and "2" to the second curve (curve next to the first curve).

First, the vehicle speed Vx is acquired in step 505. The host vehicle position Pvh is acquired in step 510. The host vehicle position Pvh is obtained from the global positioning system GPS of the navigation device NAV.

Next, the position Pc1 and the curve shape Rd of the curve at the nearest location in front of the vehicle (first curve) are acquired in step 515. Then, the position Pct and the curve shape Rc2 of the curve next to the first curve (second curve) are acquired in step 520. The curve position Pc* and the curve shape Rc* (such as the radius of curvature of the curve) are read out from curve information stored in the map information of the navigation device NAV. In addition, the radius of curvature of the curve may be estimated based on a line that is formed by storing in memory the positions of points (nodes) on the road in advance and connecting the points in a geometrically smooth manner (for example, refer to U.S. Pat. No. 3,378,490).

Next, in step 525, based on the host vehicle position Pvh and the curve position Pc*, a positional relation (relative position Pvc*, relative distance Lvc*) between the host vehicle position and each curve is calculated. Then, in step 530, the operating amount of the accelerator pedal AP (acceleration operating amount Ap) operated by the driver is acquired based on the output of the acceleration operating amount sensor AS.

Next, in step 535 the appropriate vehicle speed Vqo*, which serves as a vehicle speed at which the vehicle can pass through the curve in a stable and appropriate manner, is calculated for each curve based on the radius of curvature of the curve. Specifically, the appropriate vehicle speed Vqo* is calculated, for example, based on the radius of curvature of the interval having a constant radius of curvature (constant curvature radius interval) in the curve. The appropriate vehicle speed Vqo* may also be calculated based on the minimum radius of curvature Rm* in the curve.

Figure 6:
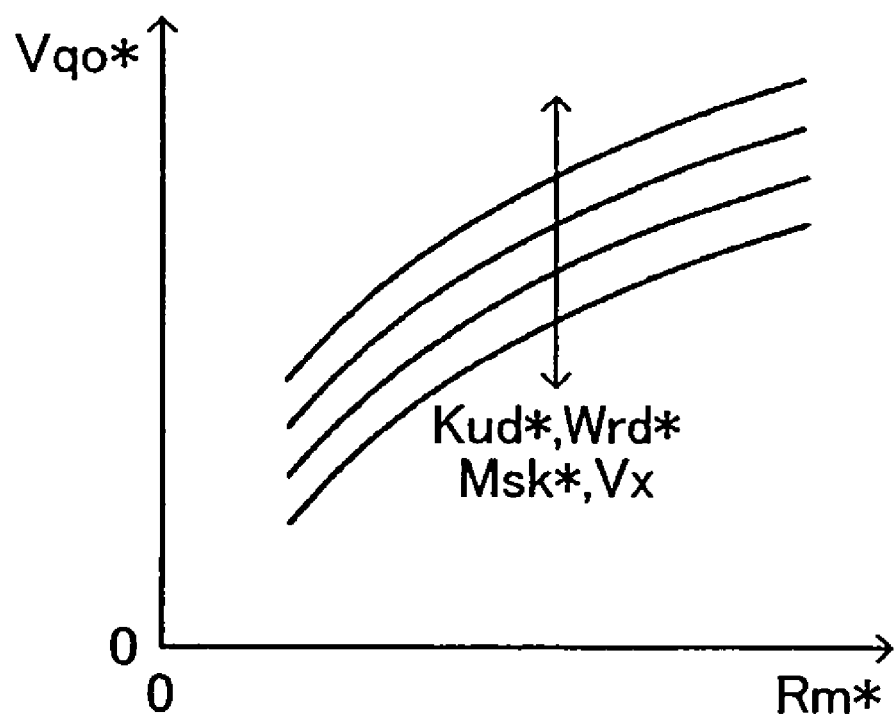
FIG. 6 is a graph showing a calculation map that is referred when calculating an appropriate vehicle speed for a curve.

As shown in FIG. 6, the appropriate vehicle speed Vqo* is calculated to be a larger value as the radius of curvature (minimum radius of curvature Rm*) of the curve is greater. In the example shown in FIG. 6, the appropriate vehicle speed Vqo* is determined so that the vehicle can pass through the curve at an approximately constant lateral acceleration, regardless of the radius of curvature.

Moreover, as shown in FIG. 6, the appropriate vehicle speed Vqo* can be adjusted based on at least one or more of an uphill/downhill gradient Kud*, a road width Wrd*, a forward visibility Msk*, and the vehicle speed Vx. Here, if the uphill/downhill gradient Kud* represents a downhill gradient, the appropriate vehicle speed Vqo* is adjusted to a smaller value than that in the case of a flat road. If the uphill/downhill gradient Kud* represents an uphill gradient, the appropriate vehicle speed Vqo* is adjusted to a larger value than that in the case of the flat road. The appropriate vehicle speed Vqo* is adjusted to a smaller value as the road width Wrd* is smaller. The appropriate vehicle speed Vqo* is adjusted to a smaller value as the forward visibility Msk* is worse. In addition, the appropriate vehicle speed Vqo* is adjusted to a smaller value as the vehicle speed Vx is higher.

Subsequently, reference points are calculated in step 540, and the curve-to-curve distance is calculated in next step 545. Then, the vehicle speed limit is set in step 550, and the target vehicle speed is calculated in next step 555.

The reference points are points that serve as references for specifying a vehicle speed characteristic to be achieved by the continuous curve vehicle speed control. The reference points include a deceleration reference point Pcr* serving as a landmark for an entrance point of an interval in which the vehicle speed is to be maintained at the appropriate vehicle speed Vqo*, and a maintenance reference point Pca* serving as a landmark for an exit point of the interval in which the vehicle speed is to be maintained at the appropriate vehicle speed Vqo*. The curve-to-curve distance is the distance of the interval between the two successive curves (the above-mentioned "curve-to-curve interval") as described above. The vehicle speed limit is a vehicle speed to which the vehicle speed is to be limited in the curve-to-curve interval. The target vehicle speed is a target for the vehicle speed to be achieved by the continuous curve vehicle speed control.

The specific processing in steps 540 to 555 will be described below with reference to FIG. 7. In a block 131, a distance Lpr* for determining the deceleration reference point Pcr* (refer to FIG. 18) is calculated based on the appropriate vehicle speed Vqo*. Specifically, the distance Lpr* is calculated so that Lpr*=0 if the value Vqo* is a predetermined value Vq1 or less, or the distance Lpr* increases as the value Vqo* increases if Vqo*>Vq1.

In a block B2, a distance Lpa* for determining the maintenance reference point Pca* (refer to FIG. 18) is calculated based on the appropriate vehicle speed Vqo* and a distance Lit* of the constant curvature radius interval (refer to FIG. 18). Specifically, the distance Lpa* is calculated so that Lpa*=0 if the distance Lit* is a predetermined value Li1 or less, or the distance Lpa* increases as the distance Lit* increases if Lit*>Li1. In addition, the distance Lpa* is calculated to be a smaller value as the value Vqo* is greater.

In a block 133, the deceleration reference point Pcr* and the maintenance reference point Pca* are determined based on the curve position Pc*, the curve shape Rc*, and the distances Lpr* and Lpa*. The deceleration reference point Pcr* is set at a point on the curve that is nearer to a curve entrance Ci* than a point Cs* (an entrance point of the interval having a constant radius of curvature in the curve (a point nearest to the vehicle in the interval having a constant radius of curvature), or a point nearest to the vehicle at which the radius of curvature in the curve is minimum) by the distance Lpr*.

The purpose for setting the deceleration reference point Pcr* in this manner is to take into consideration the case in which information such as the map information includes errors. That is, by setting the point Pcr* that corresponds to the entrance point of the interval in which the vehicle speed is to be maintained at the appropriate vehicle speed Vqo* at the point nearer to the curve entrance Ci* than the point Cs* by the distance Lpr*, the deceleration by the continuous curve vehicle speed control can be started at an earlier time. As a result, it can be suppressed from occurring caused by the existence of the errors mentioned above that the actual point at which the vehicle speed starts to be maintained at the appropriate vehicle speed Vqo* is set at a point beyond (on the side farther from the vehicle than) the point Cs*.

In addition, the maintenance reference point Pca* is set at a point on the curve that is nearer to the curve entrance Ci* than a point Ce* (an exit point of the interval having a constant radius of curvature in the curve (a point farthest from the vehicle in the interval having a constant radius of curvature)) by the distance Lpa*.

The purpose for setting the maintenance reference point Pca* in this manner is to reflect the intention of the driver to accelerate the vehicle earlier toward the exit of the curve after the vehicle speed has been maintained at the appropriate vehicle speed Vqo*. In addition, the distance Lpa* is calculated to be a small value if the appropriate vehicle speed Vqo* is high, thereby suppressing the acceleration of the vehicle from being started at an early time. As a result, a stable running of the vehicle is ensured when the vehicle speed is high.

In a block B4, the curve-to-curve distance Dcv is calculated based on the curve positions $Pc^*$ and the curve shapes $Rc^*$. It is also possible to calculate the curve-to-curve distance Dcw based on the reference points $Pcr^*$ and $Pca^*$. Specifically, the distance Dcw may be a distance of an interval between the reference points Pcr1 and Pcr2. Also, in consideration that the continuous curve vehicle speed control serves to appropriately adjust the acceleration in the curve-to-curve interval, it is preferable that the distance of the interval between Pca1 and Pcr2 be calculated as the distance Dcw.

In a block B5, the above-described allowable vehicle speed increment Vup is calculated based on the curve-to-curve distance Dcv (Dcw). As described above, the allowable vehicle speed increment Vup is the component, used for determining the vehicle speed limit Vqo1, by which the vehicle speed is allowed to increase. The increment Vup is calculated so that Vup=0 if the curve-to-curve distance Dcv (Dcw) is a predetermined value Del or less. The increment Vup is calculated so as to increase as the curve-to-curve distance Dcv (Dcw) increases if the curve-to-curve distance Dcv (Dcw) is larger than the value Del.

In a block B6, a maximum value selection unit selects a higher appropriate vehicle speed of the appropriate vehicle speeds $Vqo^*$ as Vqom. In a block B7, an adding unit adds the allowable vehicle speed increment Vup to the selected appropriate vehicle speed Vqom to calculate the vehicle speed limit Vqo1 used when passing through the curve-to-curve interval between the two successive curves. The vehicle speed limit Vqo1 is restricted so as to be the set vehicle speed Vs or less.

Figure 8:
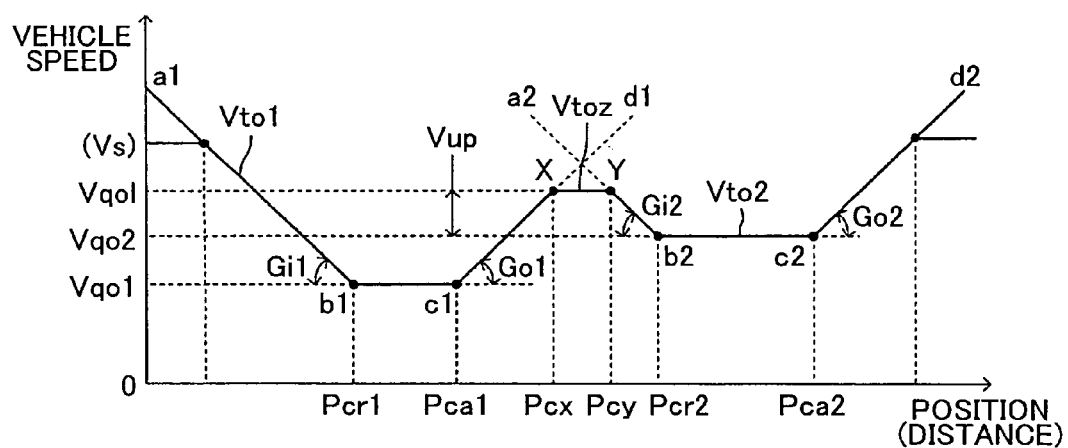
FIG. 8 is a diagram for explaining a target vehicle speed characteristic of the continuous curve vehicle speed control.

In a block B8, based on the appropriate vehicle speeds $Vqo^*$, the reference points $Pcr^*$ and $Pca^*$, and the vehicle speed limit Vqo1, the target vehicle speed characteristic Vto used when passing through the two successive curves is calculated. This target vehicle speed characteristic Vto is a target vehicle speed characteristic when the driver performs no accelerating operation. As shown in FIG. 8, the target vehicle speed characteristic Vto is constituted by sequentially connecting a target vehicle speed characteristic Vto1 for the first curve, a target vehicle speed characteristic Vtoz for the curve-to-curve interval, and a target vehicle speed characteristic Vto2 for the second curve.

The target vehicle speed characteristic $Vto^*$ (Vto1 or Vto2) is determined to be a characteristic $a^*$-$b^*$-$c^*$-$d^*$ that is obtained as follows: the target vehicle speed decreases at a deceleration $Gi^*$ (for example, a constant value) until the reference point $Pcr^*$ is reached, thus becoming the appropriate vehicle speed $Vqo^*$ at the reference point $Pcr^*$; then, after being maintained at the appropriate vehicle speed $Vqo^*$ until the reference point $Pca^*$ is reached, the target vehicle speed increases at an acceleration $Go^*$ (for example, a constant value) from the reference point $Pca^*$.

The target vehicle speed characteristic Vtoz is determined so as to be constant at the vehicle speed limit Vqo1 (Vqom=Vqo2, and Vqo1=Vqom+Vup in FIG. 8). That is, the characteristic Vtoz is determined to be a characteristic X-Y obtained by connecting with a straight line a point X corresponding to the vehicle speed Vqo1 on a characteristic c1-d1 and a point Y corresponding to the vehicle speed Vqo1 on a characteristic a2-b2.

Consequently, the target vehicle speed characteristic Vto is determined to be a characteristic in which the target vehicle speed Vto increases at the acceleration Go1 (for example, a constant value) after passing the reference point Pca1 until the vehicle speed limit Vqo1 ($\leq$set vehicle speed Vs) is reached, and after being maintained at the constant value Vqo1 between a point Pcx corresponding to the point X and a point Pcy corresponding to the point Y, decreases at the deceleration Gi1 (for example, a constant value) after passing the point Pcy. In this manner, the characteristic Vto is determined in the curve-to-curve interval so that there is the interval in which the characteristic Vto equals to the vehicle speed limit Vqo1, and also so that the value Vto does not exceed the vehicle speed limit Vqo1.

Note that although the characteristic of speed change applied to the position (distance) is actually represented by a curve in the case of a constant acceleration, the speed change is represented by a straight line to simplify the explanation in FIG. 8. The same applies also to the drawings described below.

The target vehicle speed Vto in the host vehicle position is determined by entering the actual vehicle position (host vehicle position) Pvh into the target vehicle speed characteristic Vto (calculation map specifying the relation between the position (distance) and the target vehicle speed) that has been determined as described above.

In a block B9, the modification vehicle speed Vz during the accelerating operation is calculated based on the acceleration operating amount Ap of the accelerator pedal AP operated by the driver. The acceleration operating amount Ap is acquired by the acceleration operating amount sensor AS (acceleration operating amount acquiring unit). The value Vz is calculated so that Vz=0 if the acceleration operating amount Ap is Ap1 (predetermined value) or less, or calculated so as to increase as the acceleration operating amount Ap increases if the acceleration operating amount Ap is larger than Ap1. In addition, the value Vz can have an upper limit so as to be maintained at Vz1 (predetermined value) if the operating amount Ap is Ap2 (predetermined value) or more.

In a block B10, an adding unit calculates the target vehicle speed Vt (=Vto+Vz) by adding the modification vehicle speed Vz to the target vehicle speed Vto in the host vehicle position. Specifically, the target vehicle speed Vt1 (=Vto1+Vz) is calculated in the interval corresponding to Vto1; the target vehicle speed Vtz (=Vtoz+Vz) is calculated in the interval corresponding to Vtoz; and the target vehicle speed Vt2 (=Vto2+Vz) in the interval corresponding to Vto2.

Because the target vehicle speed Vt is calculated to be a value larger than the target vehicle speed Vto by an amount of the modification vehicle speed Vz based on the acceleration operating amount Ap in the manner described above, the intention of the driver for acceleration can be reflected in the continuous curve vehicle speed control. In addition, unnecessary acceleration of the vehicle can be suppressed by providing the upper limit (Vz1) for the modification vehicle speed Vz. The specific processing in steps 540 to 555 of FIG. 5 has been described above with reference to FIG. 7.

Referring again to FIG. 5, next to step 555, it is determined whether or not the continuous curve vehicle speed control is in execution in step 560, and if the continuous curve vehicle speed control is not in execution, it is determined whether or not a control start condition is satisfied in step 565. The control start condition is satisfied when the current vehicle speed Vx (Vx=Vs, during the automatic cruise control) of the vehicle has exceeded the target vehicle speed Vt1 calculated based on the target vehicle speed characteristic Vto1 in the host vehicle position Pvh.

After this control start condition is satisfied, the continuous curve vehicle speed control is started and executed in step 570. The continuous curve vehicle speed control is executed so that the current vehicle speed Vx coincides with the target vehicle speed Vt in the host vehicle position Pvh.

That is, first of all, the vehicle is decelerated according to the target vehicle speed Vt1 that is calculated based on the target vehicle speed characteristic Vto1. Then, after the host vehicle position Pvh has reached the point Pert (the vehicle has passed the point Pcr1), the vehicle speed is adjusted according to the target vehicle speed Vt1 that is calculated based on the target vehicle speed characteristic Vto1 (maintained at the appropriate vehicle speed Vqo1 if Vz=0). After the host vehicle position Pvh has reached the point Peal (the vehicle has passed the point Pca1), the vehicle is accelerated according to the target vehicle speed Vt1 that is calculated based on the target vehicle speed characteristic Vto1, heading toward the exit of the first curve. The determination as to whether the vehicle has passed the points Pcr* and Pea* is made based on the relative position Pvc* (relative distance Lvc*).

After the host vehicle position Pvh has reached the point Pcx (the vehicle has passed the point Pcx), the vehicle speed is adjusted according to the target vehicle speed Vtz that is calculated based on the target vehicle speed characteristic Vtoz (maintained at the vehicle speed limit Vqo1 if Vz=0). Here, the vehicle speed control based on this target vehicle speed Vtz may be started when the vehicle speed Vx has exceeded the target vehicle speed Vtz, instead of being started when the host vehicle position Pvh has reached the point Pcx.

Then, after the host vehicle position Pvh has reached the point Pcy (the vehicle has passed the point Pcy), the vehicle speed control for the second curve is executed based on the target vehicle speed Vt2 that is calculated based on the target vehicle speed characteristic Vto2, in a similar manner to the vehicle speed control for the first curve in which the vehicle speed has been decelerated, maintained, and accelerated again. Here, the vehicle speed control based on this target vehicle speed Vt2 may be started when the vehicle speed Vx has exceeded the target vehicle speed Vt2, instead of being started when the host vehicle position Pvh has reached the point Pcy. The determination as to whether the vehicle has passed the points Pcx and Pcy is made based on the relative position Pvc* (relative distance Lvc*).

In step 575, it is determined whether or not a control end condition is satisfied. The control end condition is satisfied if no more continuous curve exists in front of the vehicle (and moreover, if the vehicle speed Vx has reached the set vehicle speed Vs, during the automatic cruise control). When this control end condition has is satisfied, the continuous curve vehicle speed control is terminated (during the automatic cruise control, the constant speed control or the vehicle single curve speed control is started afterward).

Description will be made below regarding setting of the target vehicle speed Vt for various shapes of the continuous curves, with reference to FIGS. 9 to 12.

<In the case where the minimum radius of curvature Rm1 of the first curve is smaller than the minimum radius of curvature Rm2 of the second curve, and the curve-to-curve distance Dcv (Dcw) is larger than the predetermined value Dc1>

Figure 9:
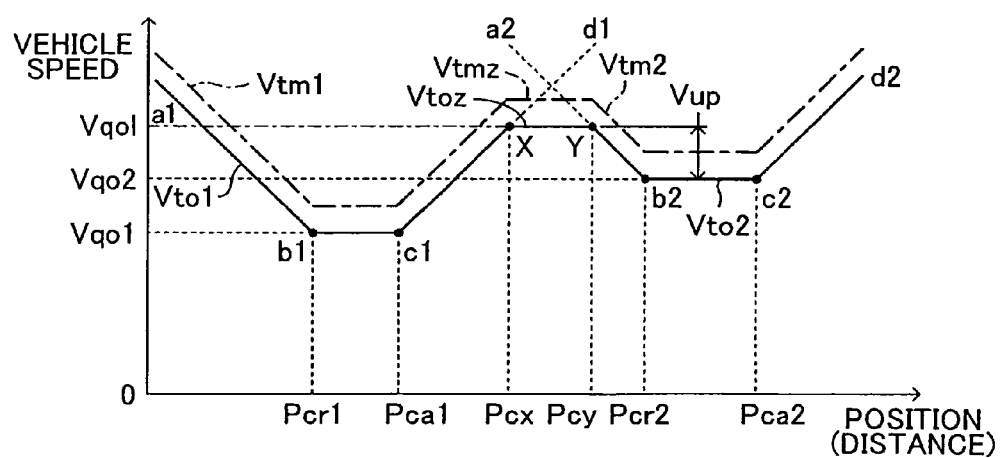
FIG. 9 is a diagram showing a specific example of the target vehicle speed characteristic of the continuous curve vehicle speed control.

As shown in FIG. 9, because Rm1<Rm2 in this case, the target vehicle speed characteristic Vto1 (characteristic a1-b1-c1-d1) and the target vehicle speed characteristic Vto2 (characteristic a2-b2-c2-d2) are determined so that a relation Vqo1<Vqo2 is satisfied. Because Dcv (Dcw)>Dc1, the allowable vehicle speed increment Vup is calculated to be a value greater than zero based on the curve-to-curve distance Dcv (Dcw), and the increment Vup is added to the appropriate vehicle speed Vqom (=Vqo2) to calculate the vehicle speed limit Vqo1. Based on this vehicle speed limit Vqo1, the target vehicle speed characteristic Vtoz (characteristic X-Y) used when running along the curve is determined. The target vehicle speed characteristic Vto is set to be the characteristic a1-b1-c1-X-Y-b2-c2-d2.

An upper limit characteristic (upper limit target vehicle speed characteristic) Vtm is set (refer to the dashed-dotted line) based on the upper limit value Vz1 (predetermined value (refer to FIG. 7)) of the modification vehicle speed Vz, where the upper limit value Vz1 is set independently of the acceleration operating amount Ap. The characteristic Vtm is constituted by sequentially connecting a characteristic Vtm1 (=Vto1+Vz1), a characteristic Vtmz (=Vtoz+Vz1), and a characteristic Vtm2 (=Vto2+Vz1). The modification vehicle speed Vz that is calculated based on the acceleration operating amount Ap is added to the target vehicle speed Vto (Vto1, Vto2, and Vto2) in the host vehicle position to calculate the target vehicle speed Vt (Vt1, Vtz, and Vt2). As a result of the above, the target vehicle speed Vt is set in the range interposed between the target vehicle speed characteristic Vto and the upper limit characteristic Vtm.

<In the case where the minimum radius of curvature Rm1 of the first curve is larger than the minimum radius of curvature Rm2 of the second curve, and the curve-to-curve distance Dcv (Dcw) is larger than the predetermined value Dc1>

Figure 10:
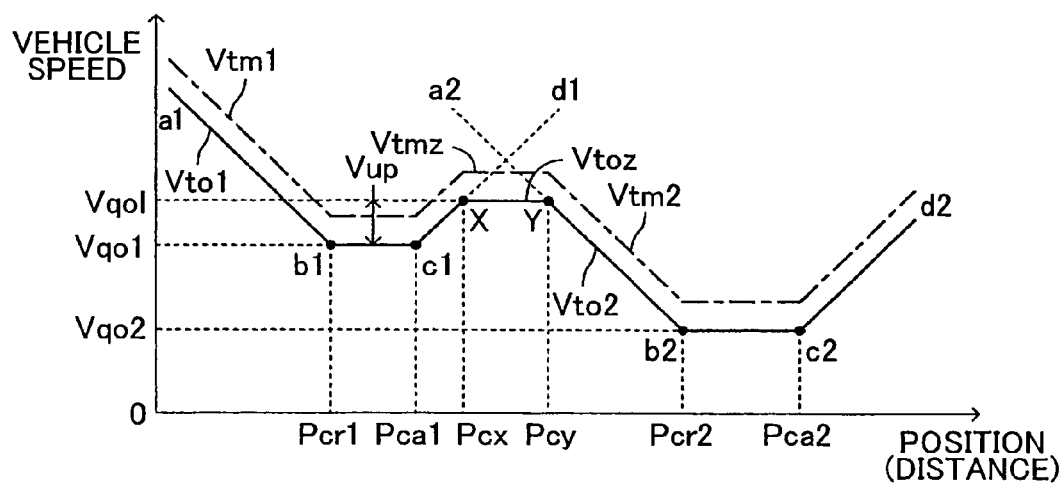
FIG. 10 is a diagram showing another specific example of the target vehicle speed characteristic of the continuous curve vehicle speed control.

As shown in FIG. 10, because Rm1>Rm2 in this case, a relation Vqo1>Vqo2 is satisfied, and therefore the increment Vup is added to the appropriate vehicle speed Vqom (=Vqo1) to calculate the vehicle speed limit Vqo1. Except the above respect, this case is the same as the case shown in FIG. 9 described above, and the target vehicle speed characteristic Vto is set to be the characteristic a1-b1-c1-X-Y-b2-c2-d2. The target vehicle speed Vt is set in the range interposed between the target vehicle speed characteristic Vto and the upper limit characteristic Vtm.

<In the case where the minimum radius of curvature Rm1 of the first curve is smaller than the minimum radius of curvature Rm2 of the second curve, and the curve-to-curve distance Dcv (Dcw) is the predetermined value Dc1 or less>

Figure 11:
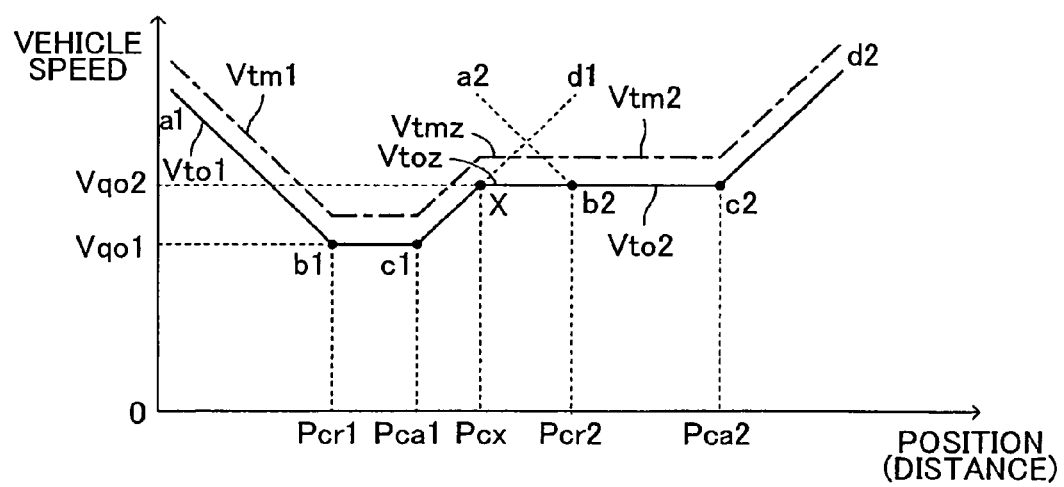
FIG. 11 is a diagram showing still another specific example of the target vehicle speed characteristic of the continuous curve vehicle speed control.

As shown in FIG. 11, the relation Vqo1<Vqo2 is satisfied in the same manner as in the case shown in FIG. 9. Because Dcv (Dcw)≦Dc1, the allowable vehicle speed increment Vup is calculated to be zero, and thereby the vehicle speed limit Vqo1 is calculated to be the same value as the appropriate vehicle speed Vqom (=Vqo2). The purpose of this is to suppress the vehicle from being unnecessarily accelerated in the curve-to-curve interval when the curves are close to each other. As a result, the point Y and the point b2 shown in FIG. 9 coincide with each other, and the target vehicle speed characteristic Vto is set to be the characteristic a1-b1-e1-X-b2-c2-d2. Except the above respect, this case is the same as the case shown in FIG. 9 described above. The target vehicle speed Vt is set in the range interposed between the target vehicle speed characteristic Vto and the upper limit characteristic Vtm.

<In the case where the minimum radius of curvature Rm1 of the first curve is larger than the minimum radius of curvature Rm2 of the second curve, and the curve-to-curve distance Dcv (Dcw) is the predetermined value Dc1 or less>

Figure 12:
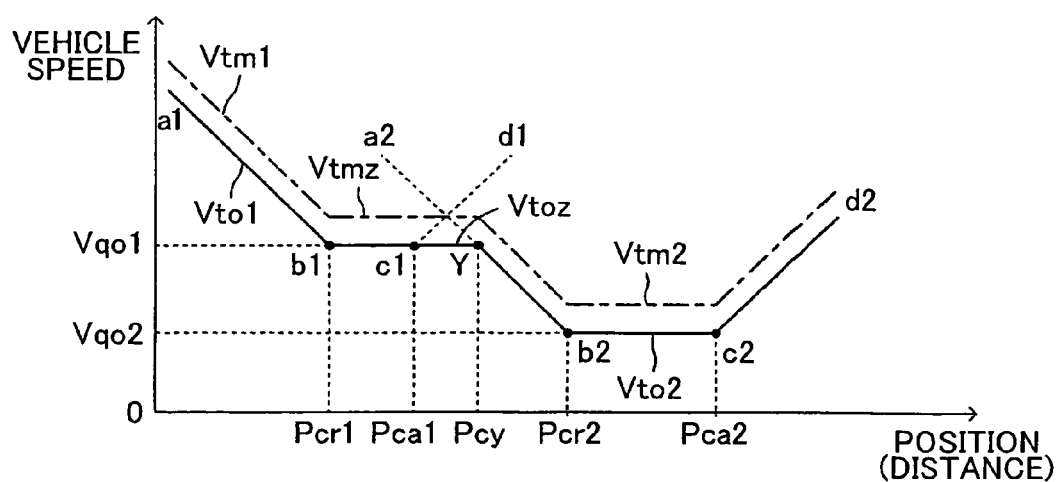
FIG. 12 is a diagram showing further still another specific example of the target vehicle speed characteristic of the continuous curve vehicle speed control.

As shown in FIG. 12, the relation Vqo1>Vqo2 is satisfied in the same manner as in the case shown in FIG. 10. Because Dcv (Dcw)≦Dc1, the allowable vehicle speed increment Vup is calculated to be zero, and thereby the vehicle speed limit Vqo1 is calculated to be the same value as the appropriate vehicle speed Vqom (=Vqo1). The purpose of this is to suppress the vehicle from being unnecessarily accelerated in the curve-to-curve interval when the curves are close to each other. As a result, the point c1 and the point X shown in FIG. 10 coincide with each other, and the target vehicle speed characteristic Vto is set to be the characteristic a1-b1-c1-Y-b2-c2-d2. Except the above respect, this case is the same as the case shown in FIG. 10 described above. The target vehicle speed Vt is set in the range interposed between the target vehicle speed characteristic Vto and the upper limit characteristic Vtm.

Next, description will be made regarding an example of vehicle speed change in the case of starting the above-described continuous curve vehicle speed control during the above-described constant speed control of the automatic cruise control, with reference to FIG. 13.

<In the Case where the Driver Does Not Operate the Accelerator Pedal AP>

In the state in which the vehicle speed is maintained at the set vehicle speed Vs that has been set by the driver in the constant speed control, if the actual vehicle speed Vx exceeds the target vehicle speed Vto1 in the host vehicle position after the continuous curve has been recognized, the continuous curve vehicle speed control is started. First, the vehicle is decelerated at the deceleration Gi1 (for example, a constant value) according to the target vehicle speed characteristic Vto1. Then, after the host vehicle position has reached the point Pcr1 (the vehicle has passed the point Pcr1), the vehicle speed is maintained at the appropriate vehicle speed Vqo1 at which the vehicle can pass through the first curve in a stable and appropriate manner. After the host vehicle position Pvh has reached the point Pca1 (the vehicle has passed the point Pca1), the vehicle is accelerated at the acceleration Go1 (for example, a constant value) according to the target vehicle speed characteristic Vto1, heading toward the exit of the first curve.

If the vehicle speed Vx exceeds the vehicle speed limit Vqo1 (=Vqo2 (Vqom)+Vup) (or if the host vehicle position Pvh has reached the point Pcx) after the vehicle has traveled further, the vehicle speed is maintained at the vehicle speed limit Vqo1. Note that the vehicle speed limit Vqo1 is restricted so as to be the set vehicle speed Vs or less.

If the vehicle speed Vx that has been maintained at the vehicle speed limit Vqo1 exceeds the target vehicle speed Vto2 for the second curve (or if the host vehicle position Pvh has reached the point Pcy) after the vehicle has traveled still further, the vehicle speed is controlled similarly to the case of passing through the first curve, as follows. The vehicle is decelerated at the deceleration Gi2 (for example, a constant value) according to the target vehicle speed characteristic Vto2, and then, after the host vehicle position Pvh has reached the point Pcr2, the vehicle speed is maintained at the appropriate vehicle speed Vqo2 at which the vehicle can pass through the second curve in a stable and appropriate manner. After the host vehicle position Pvh has reached the point Pca2, the vehicle is accelerated at the acceleration Go2 (for example, a constant value) according to the target vehicle speed characteristic Vto2, heading toward the exit of the second curve. If the vehicle speed Vx reaches the set vehicle speed Vs, the continuous curve vehicle speed control is terminated, and the vehicle speed is maintained again at the set vehicle speed Vs (the constant speed control is started).

As described above, if the driver does not operate the accelerator pedal AP, the vehicle speed is adjusted according to the target vehicle speed characteristic Vto (characteristic constituted by Vto1, Vtoz, and Vto2) without modification.

<In the Case where the Driver Operates the Accelerator Pedal AP>

If the driver operates the accelerator pedal AP, the modification vehicle speed Vz is calculated based on the acceleration operating amount Ap, and added to the target vehicle speed Vto to set the target vehicle speed Vt. The target vehicle speed Vt is limited by the upper limit characteristic Vtm that is set based on the upper limit value Vz1. Consequently, the target vehicle speed Vt is set in the range interposed between the target vehicle speed characteristic Vto and the upper limit characteristic Vtm. By setting the upper limit characteristic Vtm in this manner, unnecessary acceleration can be suppressed.

Figure 13:
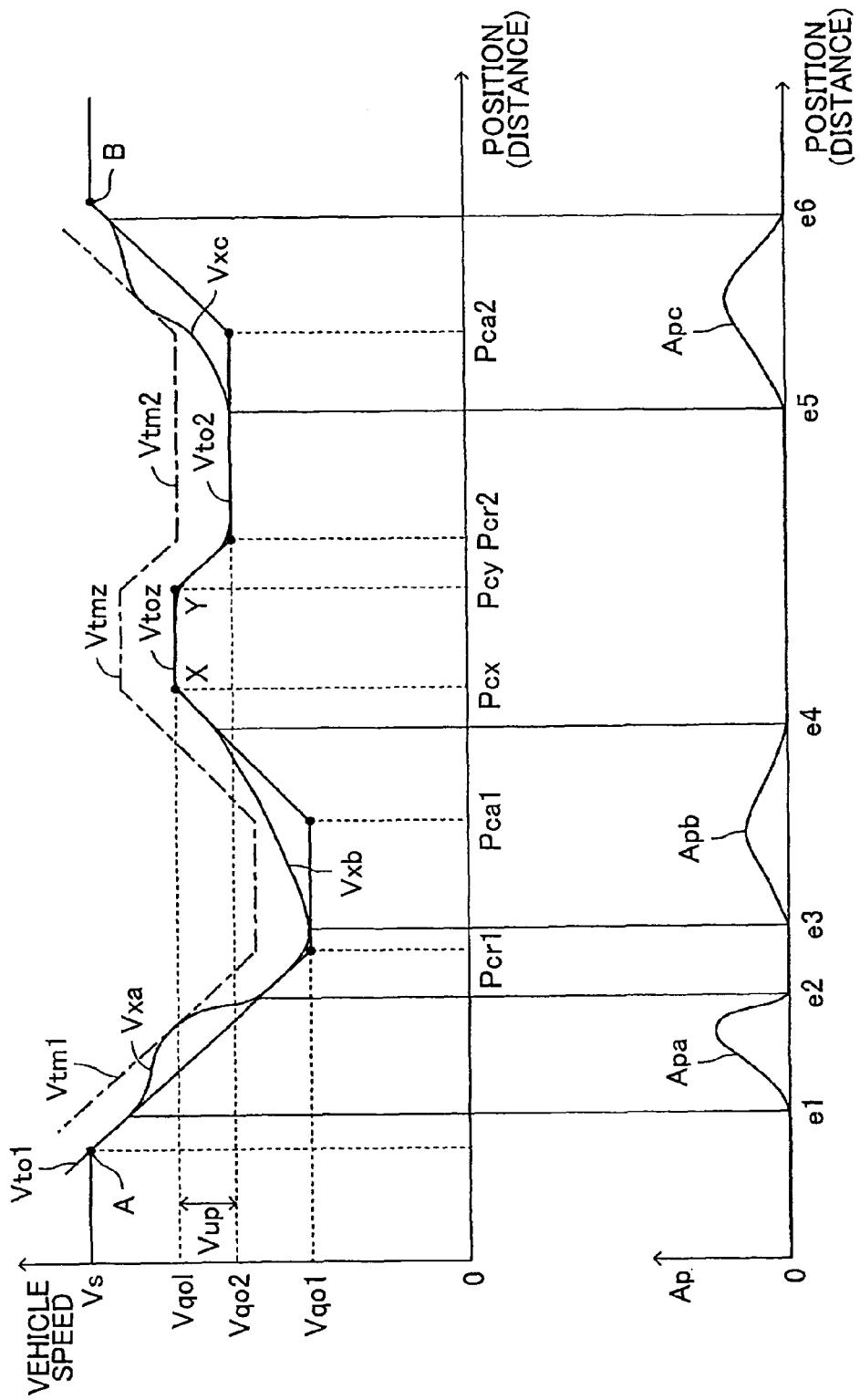
FIG. 13 is a diagram showing an example of vehicle speed change in the case of starting the continuous curve vehicle speed control during constant speed control of the automatic cruise control.

The target vehicle speed Vt is adjusted based on the acceleration operating amount Ap as described above in any one of the following intervals: the interval in which the vehicle is decelerated to the appropriate vehicle speed Vqo* (for example, refer to the vehicle speed Vxa corresponding to the acceleration operating amount Apa in FIG. 13); the interval in which the vehicle speed is maintained at the appropriate vehicle speed Vqo* or at the vehicle speed limit Vqo1 (for example, refer to the vehicle speed Vxb corresponding to the acceleration operating amount Apb in FIG. 13); and the interval in which the vehicle is accelerated to the vehicle speed limit Vqo1 or to the set vehicle speed Vs (for example, refer to the vehicle speed Vxc corresponding to the acceleration operating amount Apc in FIG. 13).

Consequently, the target vehicle speed Vt may be determined so that the vehicle is allowed to be accelerated even if the vehicle is running in the interval in which the radius of curvature of the curve gradually decreases (refer to the entrance relaxation curve interval Zci* in FIG. 18). Hereby, the driver's "intention to accelerate the vehicle" can be satisfied in the interval in which the vehicle is decelerated, and as a result, uncomfortable feeling of the driver is suppressed. In addition, because the above-described upper limit characteristic Vtm is provided, the vehicle speed does not exceed the upper limit characteristic Vtm. As a result, the vehicle can travel through the curve in a stable manner.

As described above, with the speed control device for a vehicle according to the embodiment of the present invention, in the continuous curve vehicle speed control, the target vehicle speed characteristic Vto is constituted by sequentially connecting the target vehicle speed characteristic Vto1 for the first curve, the target vehicle speed characteristic Vtoz for the curve-to-curve interval, and the target vehicle speed characteristic Vto2 for the second curve. The target vehicle speed characteristic Vto* for each of the first and second curves is determined to be the characteristic a*-b*-c*-d* in which the target vehicle speed decreases until the reference point Per* is reached, and becomes the appropriate vehicle speed Vqo* at the reference point Pcr*; and then, after being maintained at the appropriate vehicle speed Vqo* until the reference point Pea* is reached, the target vehicle speed increases from the reference point Pca*. The vehicle speed limit Vqo1 for the curve-to-curve interval is calculated by adding the allowable vehicle speed increment Vup that is calculated based on the curve-to-curve distance Dcv (Dcw) to the appropriate vehicle speed Vqom (=larger value of Vqo*). Based on this vehicle speed limit Vqo1, the target vehicle speed characteristic Vtoz for the curve-to-curve interval is determined to be the characteristic X-Y, so that there is the interval in which the target vehicle speed characteristic Vto equals to the vehicle speed limit Vqo1 in the curve-to-curve interval, and also so that the target vehicle speed characteristic Vto does not exceed the vehicle speed limit Vqo1. Then, the vehicle speed is adjusted based on the target vehicle speed characteristic Vto.

Hereby, when the vehicle passes through the successive first and the second curves, the vehicle can be accelerated, after being decelerated to the appropriate vehicle speed Vqo1 for the first curve, to the speed equal to or more than the appropriate vehicle speed Vqom that is the higher of the appropriate vehicle speeds Vqo1 and Vqo2 for the first and the second curves, respectively, and then can be decelerated to the appropriate vehicle speed Vqo2 for the second curve. As a result, it is possible to achieve the speed control conforming to the feeling of the driver and giving little sense of discomfort to the driver.

In addition, if the driver operates the accelerator pedal AP while the vehicle is running along the continuous curve, the modification vehicle speed Vz is calculated based on the acceleration operating amount Ap, and added to the target vehicle speed Vto to set the target vehicle speed Vt. As a result, the intention of the driver for acceleration can be reflected in the continuous curve vehicle speed control. Moreover, unnecessary acceleration of the vehicle can be suppressed by providing the upper limit (Vz1) for the modification vehicle speed Vz.

The present invention is not limited to the embodiment described above, but may adopt various modifications within the scope of the present invention. For example, in the embodiment described above, the modification vehicle speed Vz during the accelerating operation is calculated based on the acceleration operating amount Ap, and added to the target vehicle speed Vto (target vehicle speed Vt when Ap=0) to adjust the target vehicle speed Vt, as shown in FIG. 7 described above. However, the target vehicle speed Vt can be adjusted by adding a modification vehicle speed Vqz to the appropriate vehicle speed Vqo*. An example of this case will be described below with reference to FIG. 14.

Figure 14:
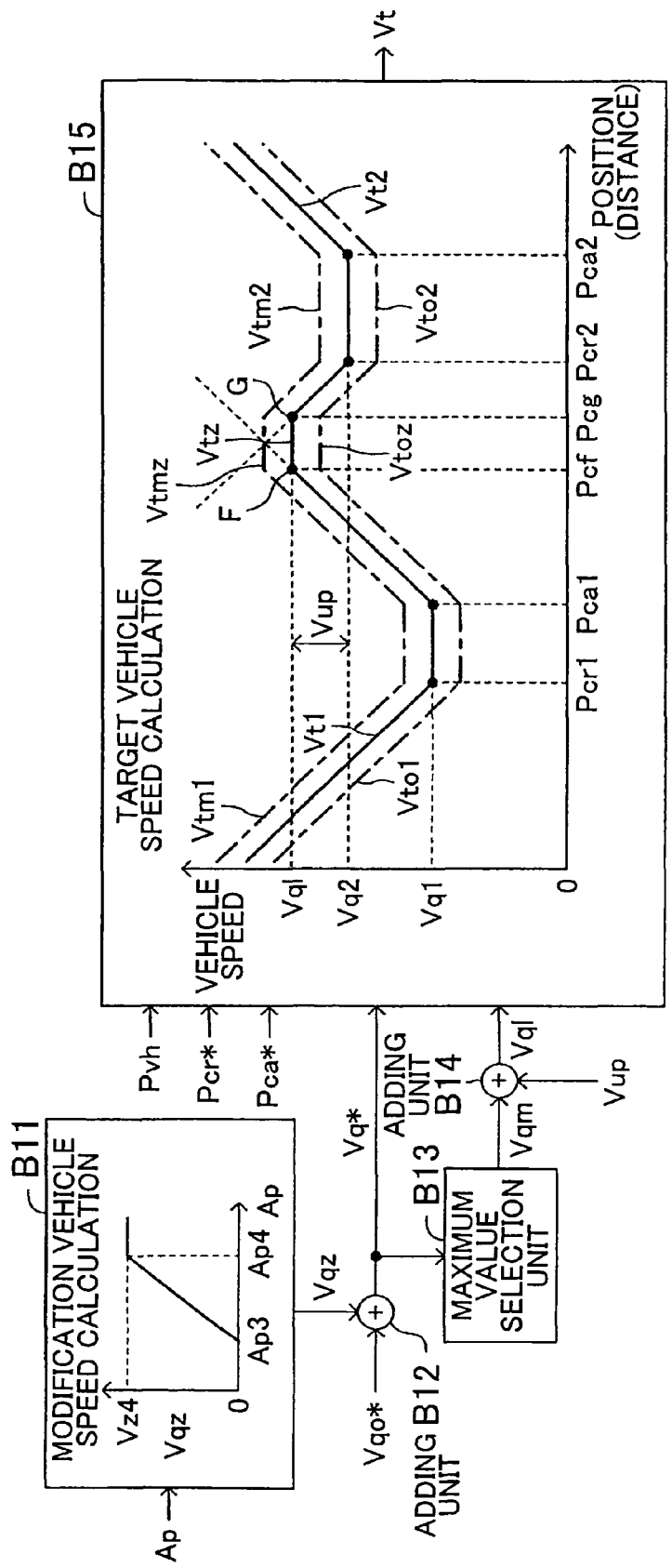
FIG. 14 is a functional block diagram for explaining main calculation processing for the continuous curve vehicle speed control executed by the speed control device for a vehicle according to a modification example of the embodiment of the present invention.

As shown in FIG. 14, in a block B11, the modification vehicle speed Vqz is calculated based on the acceleration operating amount Ap of the accelerator pedal AP operated by the driver. The value Vqz is calculated so as to establish Vqz=0 if the acceleration operating amount Ap is Ap3 (predetermined value) or less, or calculated so as to increase as the acceleration operating amount. Ap increases if the acceleration operating amount Ap is larger than Ap3. In addition, the value Vqz may have an upper limit so that the value Vqz is maintained at Vz4 (predetermined value) if the operating amount Ap is Ap4 (predetermined value) or more.

In a block B12, an adding unit adds the modification vehicle speed Vqz to the appropriate vehicle speed Vqo* to calculate an appropriate vehicle speed Vq*. The appropriate vehicle speed Vq* is an appropriate vehicle speed that takes into account the accelerating operation by the driver. In a block B13, a maximum value selection unit selects a higher appropriate vehicle speed of the appropriate vehicle speeds Vq* as Vqm. In a block B14, an adding unit adds the above-described allowable vehicle speed increment Vup to Vqm to calculate a vehicle speed limit Vq1.

Figure 7:
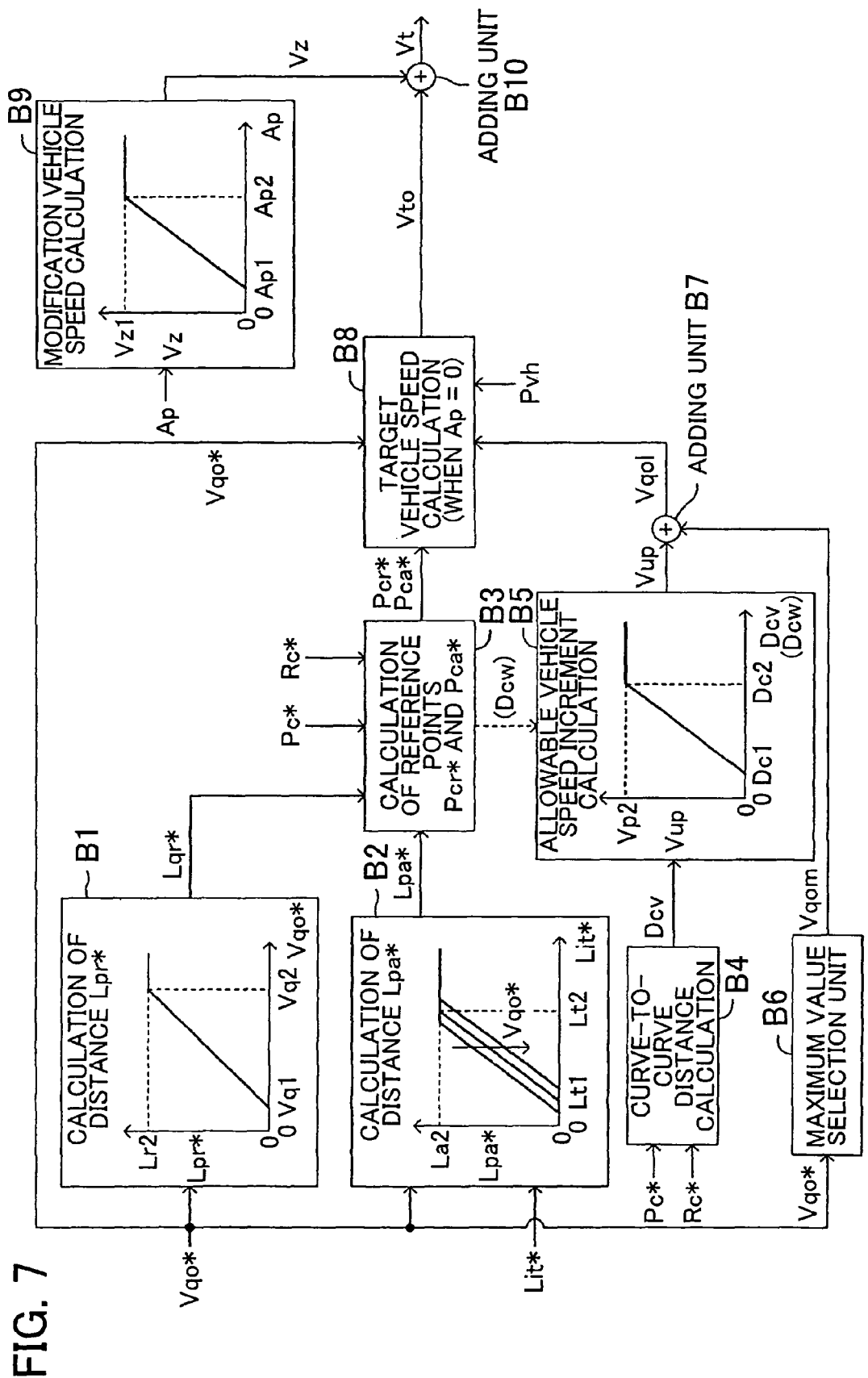
FIG. 7 is a functional block diagram for explaining main calculation processing for the continuous curve vehicle speed control executed by the device shown in FIG. 1.

In a block B15, based on the reference points Per* and Pea*, the appropriate vehicle speed Vq* and the vehicle speed limit Vq1, a target vehicle speed characteristic Vt (characteristic constituted by Vt1, Vtz, and Vt2) for calculating the target vehicle speed Vt in the host vehicle position is determined, by using the same method as that used for the above-described target vehicle speed characteristic Vto (refer to the block B8 in FIG. 7 and to FIG. 8). Then, the target vehicle speed Vt in the host vehicle position is determined by entering the actual vehicle position (host vehicle position) Pvh into the target vehicle speed characteristic Vt (calculation map specifying the relation between the position (distance) and the target vehicle speed) that has been determined as described above.

If the continuous curve vehicle speed control is executed by using this target vehicle speed Vt, the vehicle speed is controlled (decelerated, maintained, or accelerated) according to the target vehicle speed Vt1 in the first curve, and then the vehicle speed is maintained at the vehicle speed limit Vq1 according to the target vehicle speed Vtz in the curve-to-curve interval. Then, the vehicle speed is controlled (decelerated, maintained, or accelerated) according to the target vehicle speed Vt2 in the second curve.

The target vehicle speed Vt is set in response to the operation of the accelerator pedal AP by the driver, in the range bounded by the target vehicle speed characteristic Vto (characteristic constituted by Vto1, Vtoz, and Vto2) obtained when the acceleration operating amount Ap=0 and the upper limit characteristic Vtm (characteristic constituted by Vtm1, Vtmz, and Vtm2).

As a result of this, in the curve-to-curve interval, acceleration depending on the acceleration operating amount Ap is allowed according to target vehicle speed Vtz, and the appropriate vehicle speed Vq* is adjusted by being increased from the appropriate vehicle speed Vqo* depending on the acceleration operating amount Ap. As a result, the vehicle speed control conforming to an acceleration feeling of the driver can be executed. Also, the upper limit characteristic Vtm is set by providing the upper limit value Vz4 for the modification vehicle speed Vqz. Consequently, unnecessary acceleration of the vehicle can be suppressed.

In addition, although, in the above-described embodiment and the modification example described above, the acceleration operating amount Ap is taken into account by adding the modification vehicle speeds Vz and Vqz, respectively, as shown in FIGS. 7 and 14, the acceleration operating amount Ap may be taken into account by multiplication by the modification coefficient Kvz instead of the addition of the modification vehicle speeds Vz and Vqz.

Figure 15:
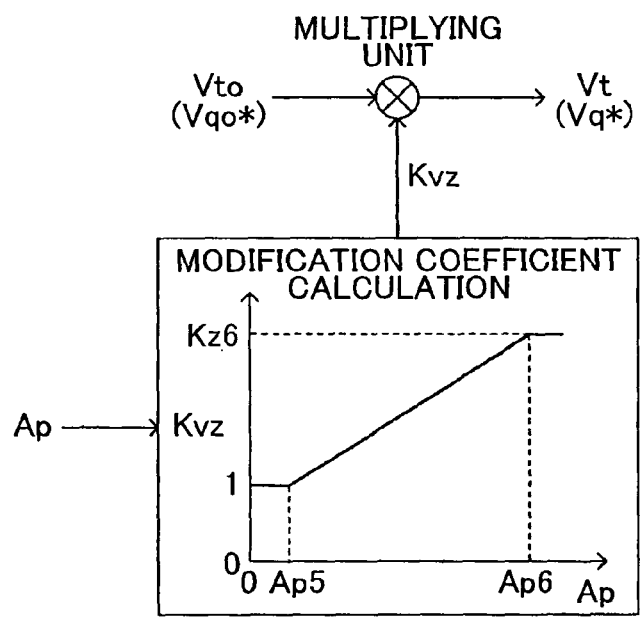
FIG. 15 is a functional block diagram for explaining calculation processing in the case of determination, by the speed control device for a vehicle according to another modification example of the embodiment of the present invention, of the target vehicle speed taking into account an accelerating operation by a driver by using a modification coefficient during the accelerating operation.
Figure 16:
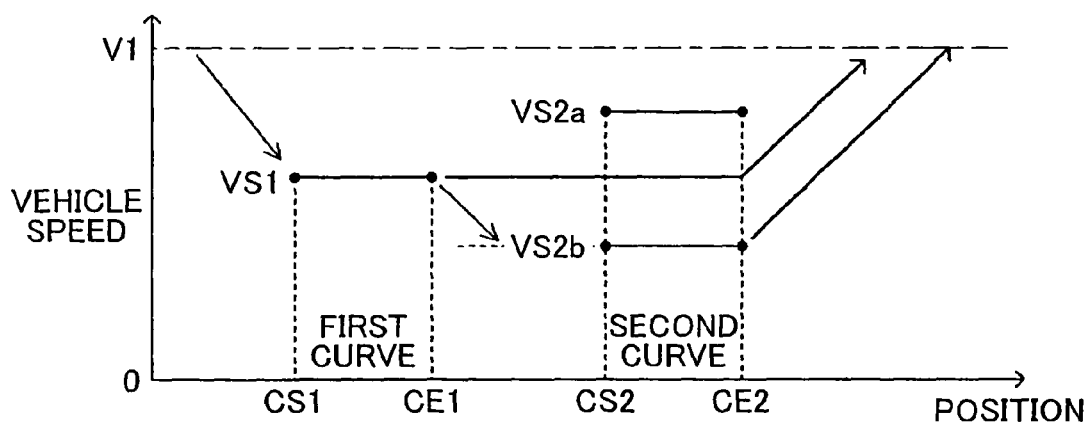
FIG. 16 is a diagram showing an example when the vehicle speed is adjusted by a related art device while running along two successive curves.
Figure 17:
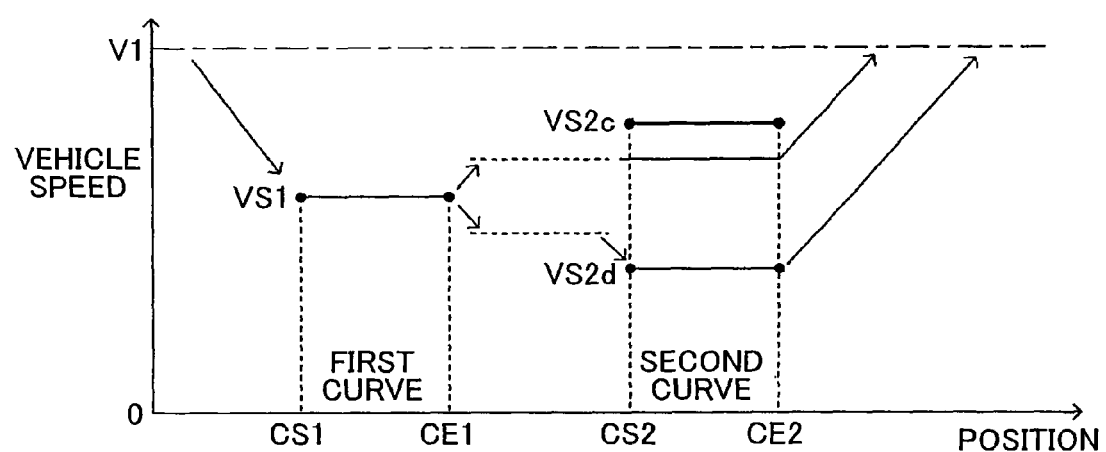
FIG. 17 is a diagram showing another example when the vehicle speed is adjusted by a related art device while running along the two successive curves.

That is, as shown in FIG. 15, the modification coefficient Kvz (>1) during the accelerating operation is calculated based on the acceleration operating amount Ap. The modification coefficient Kvz is calculated to be "1" if the acceleration operating amount Ap is Ap5 (predetermined value) or less, or calculated so as to increase from "1" as the acceleration operating amount Ap increases if Ap>Ap5. Moreover, by maintaining the coefficient Kvz at the upper limit value Kz6 (larger value than "1") if Ap>Ap6 (predetermined value), the target vehicle speed Vt can be provided with the upper limit characteristic Vtm similar to that described above. Also by using this method, the same operations and effects can be achieved as in the case that the acceleration operating amount Ap is taken into account by adding the modification vehicle speeds Vz and Vqz.

In addition, in the embodiment described above, a distance (positional relation) Lvh between the host vehicle position Pvh and a certain point can be converted to a time (arrival time interval) Tvh by using the vehicle speed Vx. Therefore, the characteristics used in the above description (characteristics shown in FIGS. 8 and 14) may be replaced with characteristics with respect to the time Tvh instead of the distance Lvh. For example, the target vehicle speed characteristic Vto can be converted to a characteristic with respect to a time Tvhr* required to reach the reference point Per* from the host vehicle position Pvh. In this case, the continuous curve vehicle speed control is executed on the basis of the arrival time interval Tvh that is calculated based on the relative positional relation (distance) between the host vehicle position Pvh and the curve position Pc* and on the vehicle speed Vx.

Besides, in the above description, explanation has been made regarding the continuous curve vehicle speed control for the two successive curves. For a continuous curve in which more than two curves succeed one another, the continuous curve vehicle speed control may be achieved by successively repeating the above-described continuous curve vehicle speed control that is executed for the two successive curves at the nearest location in front of the vehicle, each time the vehicle has passed through one of the curves.

Moreover, although the case in which the navigation device is used has been explained, the relative position between the vehicle and the curve and the radius of curvature of the curve may be acquired from an image captured by a camera mounted on the vehicle. For example, a white line on the road, a road edge, or the like is detected based on an image captured by a stereo camera mounted on the vehicle. Then, the distance distribution of an object in the whole image can be calculated based on the displacement between positions of the same object in the stereo image and on the principle of triangulation. Based on this result, the distance from the vehicle to the curve and the radius of curvature of the curve can be obtained.

Furthermore, the present invention may also be applied to a type of vehicle speed control that is not provided with the constant speed control (automatic cruise control). In this case, if the continuous curve is recognized, the vehicle is decelerated automatically (even without an accelerating or decelerating operation by the driver), and the above-described vehicle speed control depending on the curve-to-curve distance is executed. Then, the vehicle curve speed control is terminated when any curve is no longer recognized. Note that, if the constant speed control is provided, the vehicle speed control unit A8 controls the vehicle speed Vx so as to coincide with the target vehicle speed Vto or Vt. If the constant speed control is not provided, the vehicle speed control unit A8 controls the vehicle speed Vx so as not to exceed the target vehicle speed Vto or Vt (using the target vehicle speed as the upper limit value).

What is claimed is:

1. A speed control device for a vehicle, comprising:
a vehicle speed acquiring unit that acquires a speed of the vehicle;
a vehicle position acquiring unit that acquires a position of the vehicle;
a continuous curve acquiring unit that acquires curve shapes and positions of two successive curves located in front of the vehicle;
a curve-to-curve distance calculating unit that calculates a curve-to-curve distance between the two curves based on the curve shapes and the positions of the two curves;
a selection unit that selects, based on the curve shapes of the two curves, the curve shape of one of the two curves having a radius of curvature larger than that of the other of the two curves;
a vehicle speed limit setting unit that sets, based on the curve-to-curve distance and the selected curve shape, a vehicle speed limit to which the speed of the vehicle is to be limited between the two curves;
a target vehicle speed determination unit that determines, based on the vehicle position, the curve shapes and the positions of the two curves, and the vehicle speed limit, a target vehicle speed at which the vehicle is to run along the two curves;
a vehicle speed control unit that controls the speed of the vehicle based on the target vehicle speed and the vehicle speed; and
an acceleration operating amount acquiring unit that acquires an operating amount of an acceleration operating member operated by a driver of the vehicle, and
wherein the target vehicle speed determination unit is structured so as to determine, the target vehicle speed to be larger, when the operating amount is greater than zero, than the target vehicle speed when the operating amount is zero.

2. A speed control device for a vehicle, comprising:
a vehicle speed acquiring unit that acquires a speed of the vehicle;
a vehicle position acquiring unit that acquires a position of the vehicle;
a continuous curve acquiring unit that acquires curve shapes and positions of two successive curves located in front of the vehicle;
a curve-to-curve distance calculating unit that calculates a curve-to-curve distance between the two curves based on the curve shapes and the positions of the two curves;
an appropriate vehicle speed determination unit that determines, based on the curve shapes of the two curves, appropriate vehicle speeds for the vehicle to pass through the respective curves appropriately;
a vehicle speed limit setting unit that sets, based on the curve-to-curve distance, a vehicle speed limit to which the speed of the vehicle is to be limited between the two curves, to a value equal to the appropriate vehicle speed that is the higher of the two appropriate vehicle speeds, if the curve-to-curve distance is a predetermined value or less;
a target vehicle speed determination unit that determines, based on the vehicle position, the positions of the two curves, the two appropriate vehicle speeds, and the vehicle speed limit, a target vehicle speed at which the vehicle is to run along the two curves; and
a vehicle speed control unit that controls the speed of the vehicle based on the target vehicle speed and the vehicle speed.

3. The speed control device for a vehicle according to claim 1, wherein
the vehicle speed limit setting unit is structured so as to set the vehicle speed limit to be larger as the curve-to-curve distance is larger.

4. The speed control device for a vehicle according to claim 2, wherein
the vehicle speed limit setting unit is structured so as to set the vehicle speed limit to be larger as the curve-to-curve distance is larger.

5. A speed control device for a vehicle, comprising:
a vehicle speed acquiring unit that acquires a speed of the vehicle;
a vehicle position acquiring unit that acquires a position of the vehicle;
a continuous curve acquiring unit that acquires curve shapes and positions of two successive curves located in front of the vehicle;
a curve-to-curve distance calculating unit that calculates a curve-to-curve distance between the two curves based on the curve shapes and the positions of the two curves;
an appropriate vehicle speed determination unit that determines, based on the curve shapes of the two curves, appropriate vehicle speeds for the vehicle to pass through the respective curves appropriately;
a vehicle speed limit setting unit that sets, based on the curve-to-curve distance, a vehicle speed limit to which the speed of the vehicle is to be limited between the two curves, to a value equal to or more than an appropriate vehicle speed that is the higher of the two appropriate vehicle speeds;
a target vehicle speed determination unit that determines, based on the vehicle position, the positions of the two curves, the two appropriate vehicle speeds, and the vehicle speed limit, a target vehicle speed at which the vehicle is to run along the two curves; and a vehicle speed control unit that controls the speed of the vehicle based on the target vehicle speed and the vehicle speed; and an acceleration operating amount acquiring unit that acquires an operating amount of an acceleration operating member operated by a driver of the vehicle, and wherein the target vehicle speed determination unit is structured so as to determine, the target vehicle speed to be larger when the operating amount is greater than zero than the target vehicle speed when the operating amount is zero.

6. The speed control device for a vehicle according to claim 1, wherein the target vehicle speed determination unit is structured so as to determine the target vehicle speed to be larger as the operating amount is larger.

7. The speed control device for a vehicle according to claim 5, wherein the target vehicle speed determination unit is structured so as to determine the target vehicle speed to be larger as the operating amount is larger.

8. The speed control device for a vehicle according to claim 1, wherein the target vehicle speed determination unit is structured so as to determine the target vehicle speed so that an increment of the target vehicle speed from the target vehicle speed when the operating amount is zero does not exceed a predetermined upper limit.

9. The speed control device for a vehicle according to claim 5, wherein the target vehicle speed determination unit is structured so as to determine the target vehicle speed so that an increment of the target vehicle speed from the target vehicle speed when the operating amount is zero does not exceed a predetermined upper limit.

10. The speed control device for a vehicle according to claim 1, wherein the target vehicle speed determination unit is structured so as to determine the target vehicle speed to be larger when the operating amount is greater than zero than the target vehicle speed when the operating amount is zero in an interval in which the radius of curvature gradually decreases in the two curves.

11. The speed control device for a vehicle according to claim 5, wherein the target vehicle speed determination unit is structured so as to determine the target vehicle speed to be larger when the operating amount is greater than zero than the target vehicle speed when the operating amount is zero in an interval in which the radius of curvature gradually decreases in the two curves.

* * * * *